United States Patent
Becker et al.

(10) Patent No.: US 6,460,049 B1
(45) Date of Patent: *Oct. 1, 2002

(54) METHOD SYSTEM AND COMPUTER PROGRAM PRODUCT FOR VISUALIZING AN EVIDENCE CLASSIFIER

(75) Inventors: Barry G. Becker; Ron Kohavi, both of Mountain View; Daniel A. Sommerfield, San Mateo; Joel D. Tesler, Cupertino, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/218,445

(22) Filed: Dec. 22, 1998

(51) Int. Cl.$^7$ ............................................. G06F 17/30
(52) U.S. Cl. ...................... 707/104; 707/100; 707/101; 707/102
(58) Field of Search ................................. 707/104, 100, 707/101, 102, 103

(56) References Cited

U.S. PATENT DOCUMENTS

| | | | |
|---|---|---|---|
| 3,816,726 A | 6/1974 | Sutherland et al. | 345/425 |
| 4,719,571 A | 1/1988 | Rissanen et al. | 364/300 |
| 4,868,771 A | 9/1989 | Quick et al. | 364/578 |
| 4,928,247 A | 5/1990 | Doyle et al. | 345/356 |
| 4,994,989 A | 2/1991 | Usami et al. | 345/420 |
| 5,043,920 A | 8/1991 | Malm et al. | 345/419 |
| 5,072,395 A | 12/1991 | Bliss et al. | 701/200 |

(List continued on next page.)

OTHER PUBLICATIONS

Aha, D. W. et al., "Instance–Based Learning Algorithms," *Machine Learning*, vol. 6, No. 1, pp. 37–66 (Jan. 1991).

(List continued on next page.)

*Primary Examiner*—Frantz Coby
(74) *Attorney, Agent, or Firm*—Sterne, Kessler, Goldstein & Fox P.L.L.C.

(57) ABSTRACT

A method, system, and computer program product visualizes the structure of an evidence classifier. An evidence inducer generates an evidence classifier based on a training set of labeled records. A mapping module generates visualization data files. An evidence visualization tool uses the visualization data files to display an evidence pane and/or a label probability pane. A first evidence pane display view shows a normalized conditional probability of each label value, for each attribute value. The first evidence pane display view can be a plurality of rows of pie charts. Each pie slice in a pie chart has a size which is a function of the normalized conditional probability of each label value for the respective attribute value. For each pie chart, the mapping module maps a height that is a function of the number of records in the training set associated with the evidence classifier. A second evidence pane display view shows relative conditional probabilities of a selected label value, for each attribute value. The second evidence pane display view can be a plurality of rows of bars. Bar height is a function of a conditional probability of a respective attribute value conditioned on the selected label value. Bar heights can represent Evidence For a selected label value or Evidence Against a selected label. A first label probability pane display view shows a pie chart of prior probabilities of each label value based on the training set. A second label probability pane display view shows a pie chart of posterior probabilities of each label value based on at least one selected attribute value. An importance slider controls filtering of attributes based on the importance of the attributes to a classification of unlabeled records. A count slider filters out attribute values having relatively low record counts. The evidence classifier visualization tool further provides sorting of attributes and/or attribute values. A subtracting minimum evidence capability is provided.

1 Claim, 18 Drawing Sheets

U.S. PATENT DOCUMENTS

| | | | |
|---|---|---|---|
| 5,150,457 A | 9/1992 | Behm et al. | 345/420 |
| 5,164,904 A | 11/1992 | Sumner | 701/117 |
| 5,201,047 A | 4/1993 | Maki et al. | 707/3 |
| 5,247,666 A | 9/1993 | Buckwold | 395/600 |
| 5,251,131 A | 10/1993 | Masand et al. | 364/419.08 |
| 5,253,333 A | 10/1993 | Abe | 395/62 |
| 5,282,262 A | 1/1994 | Kurashige | 345/426 |
| 5,295,243 A | 3/1994 | Robertson et al. | 345/348 |
| 5,307,456 A | 4/1994 | MacKay | 345/328 |
| 5,325,445 A | 6/1994 | Herbert | 382/38 |
| 5,418,946 A | 5/1995 | Mori | 707/3 |
| 5,420,968 A | 5/1995 | Johri | 395/133 |
| 5,426,780 A | 6/1995 | Gerull et al. | 707/4 |
| 5,459,829 A | 10/1995 | Doi et al. | 345/420 |
| 5,463,773 A | 10/1995 | Sakakibara et al. | 707/104 |
| 5,519,865 A | 5/1996 | Kondo et al. | 707/100 |
| 5,528,735 A | 6/1996 | Strasnick et al. | 395/127 |
| 5,553,163 A | 9/1996 | Nivelle | 382/227 |
| 5,555,354 A | 9/1996 | Strasnick et al. | 395/127 |
| 5,659,731 A | 8/1997 | Gustafson | 395/604 |
| 5,671,333 A | 9/1997 | Catlett et al. | 395/20 |
| 5,675,711 A | 10/1997 | Kephart et al. | 395/22 |
| 5,675,785 A | 10/1997 | Hall et al. | 395/613 |
| 5,675,786 A | 10/1997 | McKee et al. | 395/614 |
| 5,680,476 A | 10/1997 | Schmidt et al. | 382/159 |
| 5,694,524 A | 12/1997 | Evans | 395/77 |
| 5,696,964 A | 12/1997 | Cox et al. | 707/5 |
| 5,706,495 A | 1/1998 | Chadha et al. | 395/602 |
| 5,724,573 A | 3/1998 | Agrawal et al. | 707/6 |
| 5,727,199 A | 3/1998 | Chen et al. | 707/5 |
| 5,748,852 A | 5/1998 | Mahler | 395/61 |
| 5,787,274 A | 7/1998 | Agrawal et al. | 395/613 |
| 5,930,803 A * | 7/1999 | Becker et al. | 707/104 |

OTHER PUBLICATIONS

Almuallin, H. and Dietterich, T. G., "Learning Boolean Concepts in the Presence of Many Irrelevant Features," *Artificial Intelligence*, vol. 69, No. 1–2, pp. 279–305 (Sep. 1994).

"Angoss Software Announces Knowledge Studio Data Mining Solution," http://www.pathfinder.com/@@xIEkO-gYAVjbJZjKM/money/latest/press/PW/1997Oct27/92. Angoss Software Corporation, pp. 1–2, Oct. 1997.

"Angoss Software's KnowledgeSEEKER(TM) Compatible With SAS Institute," http://www.newswire.ca/releases/September1997/18/c3915.html, pp. 1–2, Canada Newswire, Sep. 1997.

Breiman et al., *Classification and Regression Trees*, Wadsworth International Group, entire book (1984).

Cestnik, B., "Estimating Probabilities: A Crucial Task in Machine Learning," *Proceedings of the 9th European Conference on Artificial Intelligence*, pp. 147–149 (Aug. 1990).

"Companies in Data Mining and Knowledge Discovery," http://kdnuggets.com/companies.html, pp. 1–4, Last updated: Oct. 31, 1997.

Cormen, T. H., et al., Introduction to Algorithms. The MIT Press, pp. 263–280 (1990).

Cover and Thomas, Elements of Information Theory, Wiley Interscience, entire book, 1991.

Dasarathy, B. V., "Nearest Neighbor (NN) Norms: (NN) Patterns Classification Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., Pattern Classification and Scene Analysis, Wiley, entire book, (1973).

Fairchild, K. M., "Information Management Using Virtual Reality–Based Visualizations," Virtual Reality Applications and Explorations. ed. A. Wexelblat, Academic Press, Inc., pp. 45–74, Copyright (1993), Publication date Jul. 1, 1993.

Fisher, R. A., "The use of multiple measurements in taxonomic problems," *Annals of Eugenics*, vol. 7., No. 1, pp. 179–188 (1936).

Friedman, J. H. et al., "Lazy Decision Trees," Proceedings of the Thirteenth National Conference on Artificial Intelligence, AAAI Press and the MIT Press, vol. 1, pp. 717–724 (1996).

Good, I. J., *The Estimation of Probabilities: An Essay on Modern Bayesian Methods*, pp. xi–xii, MIT Press, pp. 1–79, (1965).

"IBM Digs Deep for Data Mining 'Gold'," http://www.software.ibm.com/data/intelli–mine/factsheet.html, pp. 1–8, IBM Corporation, Copyright 1997.

"KD Mine: Data Mining and Knowledge Discovery," http//kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., The Art of Computer Programming, Addison–Wesley, vol. 2, pp. 506–550 (1973).

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R., "A Study of Cross–Validation and Bootstrap for Accuracy Estimation and Model Selection," Proceedings of the 14th International Joint Conference on Artifical Intelligence, Stanford University, 1995.

Kohavi, R. and John, G., "Wrappers for Feature Subset Selection," http://robotics.stanford.edu/~{ronnyk,gjohn}, May 20, 1997.

Kohavi, R. and Li, C., "Oblivious Decision Trees, Graphs, and Top–Down Pruning," Proceedings of the 14th International Joint Conference on Artificial Intelligence, Chriss S. Mellish (Ed.), Morgan Kaufmann Publishers, Inc., pp. 1071–1077 (1995).

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," Proceedings of the Tenth Conference on Uncertainty in Artificial Intelligence, Morgan Kaufmann Publishers, Inc., pp. 399–406 (Jul. 1994).

Langley, P. and Sage, S., "Oblivious Decision Trees and Abstract Cases," Working Notes of the AAAI–94 Workshop on Case–Based Reasoning, AAAI Press, pp. 113–117 (1994).

Langley, P., et al., "An Analysis of Bayesian Classifiers," *Proceedings of the Tenth National Conference on Artificial Intelligence*, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Michie et al., *Machine Learning, Neural and Statistical Classification*, Ellis Norwood United, entire book, (1994).

Murthy, S. et al., "Randomized induction of oblique decision trees," Proceedings of the Eleventh National Conference on Artificial Intelligence, AAI Press/MIT Press, pp. 322–327 (1993).

"Other Web Sites for Data Mining and Knowledge Discovery," http://kdnuggets.com/websites.html, pp. 1–3, Last updated: Sep. 10, 1997.

Quinlan, J. R., C4.5: Programs for Machine Learning, Morgan Kaufmann Publishers, Inc., pp. 17–26 (1993).

Quinlan, J. R., "Induction of Decision Trees," *Machine Learning*, vol. 1, No. 1,pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," Machine Learning: Proceedings of the Eleventh International Conference, Morgan Kaufmann Publishers, Inc., pp. 259–265 (1994).

Shavlik, J. W. and Dietterich, T. G. (Eds.), Readings in Machine Learning, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," Proceedings of the Seventh National Conference on Artificial Intelligence, Morgan Kaufmann, vol. 2, pp. 601–606 (Aug. 1988).

Weiss, S. M. and Kulikowski, C. A., *Computer Systems That Learn: Classification and Prediction Methods from Statistics, Neural Nets, Machine Learning, and Expert Systems*, Morgan Kaufmann Publishers, Inc., entire book, (1991).

MineSet User's Guide, Silicon Graphics Computer Systems, 1996, made available to public less than one year prior to Apr. 30, 1997.

Greenwood, J., "Countdown to the Cybermarket," Financial Post Magazine, Mar., 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, p. 1, (Jan. 9, 1998).

"Silicon Graphics MineSets Wins Bronze Miner Award," http://www.sgi.com/Headlines/1997/October/mineset_release.html, pp. 1–2, (Oct. 1, 1997).

"The 1997 Database Dozen," by D. Stodder, http://www.dbpd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *Data Management Strategies*, Copyright 1997 Cutter Information Corp.).

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*,(Jan. 1993), pp. 32–35.

Graves, G. L., "NASA's Virtual Reality", *New Media*, (Jan. 1993), p. 36–38.

Graves, G. L., "Invasion of the Digital Puppets", *New Media*, (Jan. 1993), p. 38–40.

Yavelow, C., "3–D Sound Found In Space", *New Media*, (Jan. 1993), pp. 40–41.

Johnson, Brian and Ben Shneiderman, "Tree–Maps: A Space–Filling Approach to the Visualization of Hierarchical Information Structures", *IEEE Visualization Proceedings '91*, Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *BYTE*, Apr. 1992, pp. 175–182.

Clarkson, Mark A., "An Easier Interface", *BYTE*, Feb. 1991, pp. 277–282.

Radding, Alan, "PC GIS: Expert Gain But Also Some Pain", *Computerworld*, Feb. 17, 1992, p. 89.

Hilderbrand, Carol, "GIS Vital In Utility's Duel with Competitor", *Computerworld*,Jan. 20, 1992, p. 43.

Anthes, G. H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26 (17)*, Apr. 27, 1992, p. 26.

Fairchild, Kim M., Steven E. Poltrock and George W. Furnas, "SemNet: Three–Dimensional Graphic Representations of Large Knowledge Bases", Cognitive Science and its Applications for Human–Computer Interaction, Guindon, Ed., 1988, pp. 201–233.

Precision Visuals International Limited, "Summary of PV–WAVE Point & Click Visual Data Analysis Software", 1991.

Flanagan, William G., "Cyberspace Meets Wall Street", *Forbes*, Jun. 22, 1992, pp. 164–168.

Grinstein, G. et al., "Visualization for Knowledge Discovery", *Int. J. Intelligent Systems 7*, 1992, pp. 637–648.

Fuller, J. E., Using Autocad, 3d Ed., Chapter 17, *Viewing 3–D Drawings*, 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25 (18)*, May 6, 1991, p. 20.
Benedikt, M., ed., Cyberspace First Steps, The MIT Press, Cambridge, Massachusetts (1992), pp. 1–436.
Forrest, D., "Seeing Data in New Ways", *Computerworld*, Jun. 29, 1992, pp. 85–86.
Newquist, H. P., "Virtual Reality's Commercial Reality", *Computerworld 26 (3)*, pp. 93–95.
"Atlas Software: A New Dimension in Data Management", advertisement, Atlas Software, Strategic Mapping, Inc., San Jose, CA 95117 (page and date unknown).
"News: What's New—Business Software", *BYTE*, Mar. 1992, p. 78.
"A Map for all Reasons", advertisement, Strategic Mapping, Inc., San Jose, CA 95117 (page and date unknown).
News Release, Company: Information Builders, Dateline: Pacific Palisades, CA "Remarkable 3D Main–Frame Graphics Available For PC Users", Feb. 1985.
News Release, Company: Information Builders, Inc., Dateline: Palm Desert, CA, "Information Builders Announces Release 3.0 of PC/Focus DBMS", Jun. 1, 1987.
News Release, Company: Honeywell Bull, Dateline: Bilerica, MA "Relational Software System Increases Integration, Productivity of Honeywell Bull Users", Jul. 17, 1987.
News Release, Company: Alliant Computer Systems, Dateline: San Diego, CA, "TGS'Figaro To Be Marketed With Silicon Graphics", Jul. 8, 1988.
News Release, Company: Alliant Computer Systems, Dateline: Atlanta, GA, "Alliant Debuts New Class of System The Visual Supercomputer", Aug. 2, 1988.
News Release, Company: Virtus, Dateline: Pleasanton, CA, "INDIVIDUAL Software Introduces Training for Microsoft Excel 3.0 Windows and Macintosh Versions", Jul. 31, 1991.
News Release, Company: Virtus Corporation, Dateline: Cary, NC, "Virtus Walkthrough Releases Quicktime Component", Nov. 1, 1991.
New Release, Company: Alias Reseach, Dateline: Toronto, Ontario, "Alias Ships Sketch!, Freeform 3D Illustration and Design Program", Nov. 15, 1991.
New Release, Company: Structural Dynamics Res. Intl. Business Machines, Dateline: Boston MA "Alias Sketch (TM) Resumes Shipping: Freeform 3D Illustration and Design Tool", Feb. 19, 1992.
Pollack, A., "The 2–D Screen Gives 3–D World" New York Times (date unknown).
Foley et al., "Computer Graphics: Principals and Practice", Second Edition, Addison–Wesley Publishing Co., 1990, pp. 731–734 and color plate III.23.
Ahlberg et al., "IVEE: An Information Visualization & Exploration Environment," Proceedings of Information Visualization '95, 1995, pp. 66–73.
Becker et al., "Smooth Transitions between Bump Rendering Algorithms," *Computer Graphics Proceedings*, Annual Conference Series, 1993, pp. 183–190.
Becker et al., "Unsteady Flow Volumes," *Proceedings of Visualization '95*, pp. 329–335.
Blinn, James F., "Light Reflection Functions for Simulation of Clouds and Dusty Surfaces," *Computer Graphics*, vol. 16, No. 3, Jul. 1982, p. 116–124.
Crawfis et al., "Texture Splats for 3D Scalar and Vector Field Visualization," *Proceedings of IEEE Visualization '93*, 1993, pp. 261–265.

Crawfis et al., "Vector Field Visualization," *Computer Graphics and Applications*. vol. 14, 1994, pp. 50–56.
Inselberg et al., "Parallel Coordinates: A Tool for Visualizating Multidimensional Geometry," *Proceedings of Visualization '90*, pp. 361–378.
Laur et al., "Hierarchical Splatting: A Progressive Refinement Algorithm for Volume Rendering," *Computer Graphics*, vol. 25, No. 4, Jul. 1991, pp. 285–288.
Levoy, Marc, "Volume Rendering: Display of Surfaces from Volume Data," *IEEE Xomputer Graphics and Applications*, vol. 8, No. 5, May 1988, pp. 29–37.
Martin et al., "High Dimensional Brushing for Interactive Exploration of Multivariate Data," *Proceedings of Visualization '95*, 1995, pp. 271–278.
Max et al., "Bump Shading for Volume Textures," *IEEE Computer Graphics and Applications*, Jul. 1994, 18–20.
Max et al., "Flow Volumes for Interactive Vector Field Visualization," *Proceedings of Visualization '93*, 1993, pp. 19–24.
Sabella, Paolo, "A Rendering Algorithm for Visualizing 3D Scalar Fields," *Computer Graphics*, vol. 22, No. 4, Aug. 1988, pp. 51–58.
Stein et al., "Sorting and Hardware Assisted Rendering for Volume Visualization," *IEEE*, 1995, pp. 83–89.
Van Wijk et al., "HyperSlice," *Proceedings of Visualization '93*, 1993, pp. 119–125.
Westover, Lee, "Footprint Evaluation for Volume Rendering," *Computer Graphics*, vol. 24, No. 4, Aug. 1990, pp. 367–376.
Wilhelms et al., "A Coherent Projection Approach for Direct Volume Rendering," *Computer Graphics*, vol. 25, No. 4, Jul. 1991, pp. 275–284.
Wong et al., "Dual Multiresolution HyperSlice for Multivariate Data Visualization," *IEEE Symposium on Information Visualization*, Oct. 1996, pp. 74–75.
Amsbury, W., Data Structures from Arrays to Priority Queues. Wadsworth Publishing, Belmont, CA, pp. viii and 331–336, Copyright 1985.
Date et al., A Guide to SQL/DS, Addison–Wesley Publishing, New York, NY, pp. xiii and 97–118, Copyright 1989.
Hecht–Nielsen, R., Neurocomputing, Addison–Wesley Publishing, pp. ix–xiii and 175–201, Copyright 1990.
Hsiao et al., "Supervised Textured Imaged Segmentation Using Feature Smoothing and Probabilistic Relaxation Techniques", *IEEE Transactions on Pattern Analysis and Machine Intelligence*, vol. 11, No. 12, pp. 1279–1292, Dec. 1989.
Robert et al., "Continuously Evolving Classification of Signals Corrupted by an Abrupt Change", *IEEE–IMS Workshop on information theory and statistics*, p. 97, Oct. 1994.
Santos–Victor et al., "A Computer Vision System for the Characterization and Classification of Flames in Glass Furnaces", *IEEE Transactions on Industry Applications*, vol. 29, No. 3, pp. 470–478, Jun. 1993.
Taxt et al., "Segmentation of Document Images", *IEEE Transactions on Pattern Analysis and Machine Intelligence*, vol. 11, No. 12, pp. 1322–1329, Dec. 1989.

\* cited by examiner

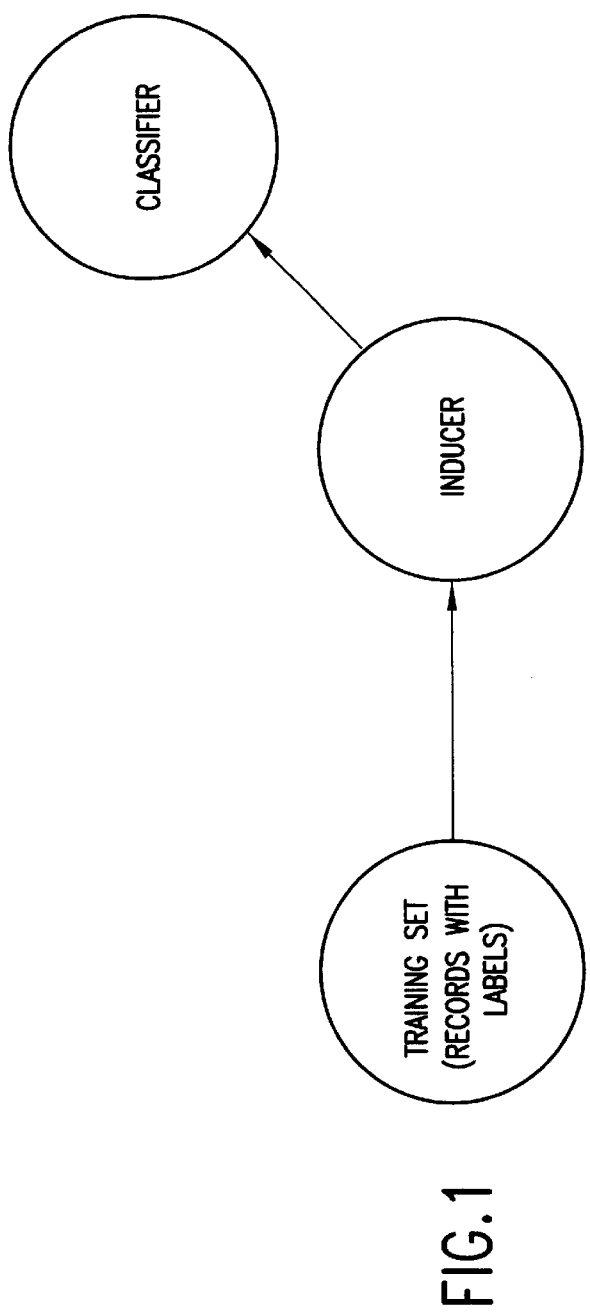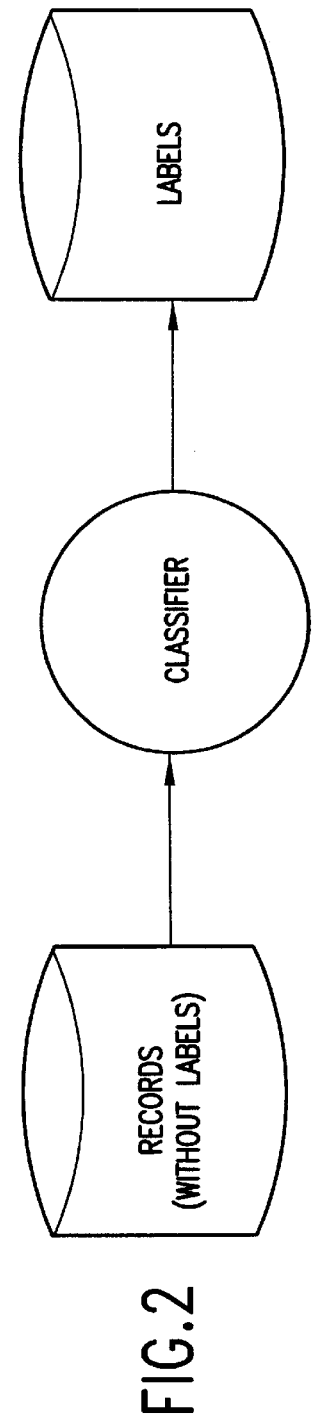
FIG.1
FIG.2

| | Descriptive Attributes | | | | Label |
|---|---|---|---|---|---|
| | sepal_length → | sepal_width → | petal_length → | petal_width → | iris_type → |
| Record 1 → | 5.1 | 3.5 | 1.4 | 0.2 | Iris-setosa |
| Record 2 → | 5.9 | 3 | 5.1 | 1.8 | Iris-virginica |
| Record 3 → | 6.5 | 2.8 | 4.6 | 1.5 | Iris-versicolor |
| • | 6.3 | 2.9 | 5.6 | 1.8 | Iris-virginica |
| • | 6.5 | 3 | 5.8 | 2.2 | Iris-virginica |

FIG.3

METHOD SYSTEM AND COMPUTER PROGRAM PRODUCT FOR VISUALIZING AN EVIDENCE CLASSIFIER

CROSS-REFERENCE TO RELATED APPLICATION

This patent application is related to the following commonly owned United States utility applications:

1. "Method, System, and Computer Program Product for Visualizing a Decision-Tree Classifier," by R. Kohavi et al. (appl. Ser. No. 08/813,336 now U.S. Pat. No. 6,278,464, filed Mar. 7, 1997, incorporated herein by reference; and
2. "Method, System, and Computer Program Product for Computing Histogram Aggregations," by Rathmann et al. (Appl. Ser. No. 08/815,473 now U.S. Pat. No. 5,960,435, filed Mar. 11, 1997, incorporated herein by reference.

BACKGROUND OF THE INVENTION

1. Field of the Invention

The present invention relates generally to machine learning, data mining, and data visualization.

2. Related Art

Many data mining tasks require classification of data into classes. Typically, a classifier classifies data into. classes. The classifier provides a function that maps (classifies) a data item (instance) into one of several predefined classes (labels). More specifically, the classifier predicts one attribute of a set of data given one or more other attributes. For example, in a database of iris flowers, a classifier can be built to predict the type of iris (iris-setosa, iris-versicolor or iris-virginica) given the petal length, petal width, sepal length and sepal width. The attribute being predicted (in this case,: the type of iris) is called the label, and the attributes used for prediction are called the descriptive attributes.

A classifier is generally constructed by an inducer. The inducer is an algorithm that builds the classifier from a training set. The training set consists of records with labels. The training set is used by the inducer to "learn" how to construct the classifier as shown in FIG. 1. Once the classifier is built, it can be used to classify unlabeled records as shown in FIG. 2.

Inducers require a training set, which is a database table containing attributes, one of which is designed as the class label. The label attribute type must be discrete (e.g., binned values, character string values, or few integers). FIG. 3 shows several records from a sample training set pertaining to an iris database. The iris database was originally used in Fisher, R. A., "The use of multiple measurements in taxonomic problems," in Annals of Eugenics 7(1):179–188, (1936). It is a classical problem in many statistical texts.

Once a classifier is built, it can classify new unlabeled records as belonging to one of the classes. These new records must be in a table that has the same attributes as the training set; however, the table need not contain the label attribute. For example, if a classifier for predicting iris_type is built, the classifier can be applied to records containing only the descriptive attributes, and a new column is added with the predicted iris type. See, e.g., the general and easy-to-read introduction to machine learning, Weiss, S. M., and Kulikowski, C. A., *Computer Systems that Learn*, San Mateo, Calif., Morgan Kaufmann Publishers, Inc. (1991), and the edited volume of machine learning techniques, Dietterich, T. G. and Shavlik, J. W. (eds.), *Readings in Machine Learning*, Morgan Kaufmann Publishers, Inc., 1990 (both of which are incorporated herein by reference).

A well known type of classifier is an Evidence classifier, also called a Bayes classifier or a Naive-Bayes classifier. The Evidence classifier uses Bayes rule, or equivalents thereof, to compute the probability of each class given an instance. Under the Bayes rule, attributes are assumed to be conditionally independent by the Evidence classifier in determining a label. This conditional independence can be assumed to be a complete conditional independence as in a Naive-Bayes classifier or Simple Bayes classifier. Alternatively, the complete conditional independence assumption can be relaxed to optimize classifier accuracy or further other design criteria.

For more information on classifiers, see the following documents, each of which is incorporated by reference in its entirety herein: Kononenko, I., *Applied Artificial Intelligence* 7:317–337 (1993) (an introduction to the evidence classifier (Naive-Bayes)); Schaffer, C., "A Conservation Law for Generalization Performance," in Machine Learning: *Proceedings of the Eleventh International Conference*, Morgan Kaufmann Publishers, Inc., pp. 259–265 (1994) (a paper explaining that no classifier can be "best"); Taylor, C., et al., *Machine Learning, Neural and Statistical Classification*, Paramount Publishing International (1994) (a comparison of algorithms and descriptions); Langley et al, "An Analysis of Bayesian Classifiers," *Proceedings of the Tenth National Conference on Artificial Intelligence*, pp. 223–228 (1992) (a paper describing an evidence classifier (Naive-Bayes)); Good, I. J., *The Estimation of Probabilities: An Essay on Modern Bayesian Methods*, MIT Press (1965) (describing an evidence classifier), and Duda, R. and Hart, P., *Pattern Classification and Scene Analysis*, Wiley (1973) (describing the evidence classifier); and Domingos, P. and Pazzani, M.,_"Beyond Independence: Conditions for the Optimality of the Simple Bayesian Classifier," *Machine Learning, Proceedings of the* 13*th International Conference* (ICML '96), pp. 105–112 (1996) (showing that, while the conditional independence assumption can be violated, the classification accuracy of the evidence classifier (called Simple Bayes in this paper) can be good).

Data mining applications and end-users now need to know how an evidence classifier maps each record to a label. Understanding how an evidence classifier works can lead to an even greater understanding of data. Current classifier visualizers are directed to other types of classifiers, such as, decision-tree classifiers. See, e.g., the AT&T product called Dotty that displays a decision-tree classifier in a 2-D ASCII text display. For an introduction to decision tree induction see Quinlan, J. R., C4.5: *Programs for Machine Learning*, Los Altos, Calif., Morgan Kaufmann Publishers, Inc. (1993); and the book on decision trees from a statistical perspective by Breiman et al., *Classification and Regression Trees*, Wadsworth International Group (1984).

What is needed is an evidence classifier visualizer.

SUMMARY OF THE INVENTION

An evidence classifier visualization tool is needed to display information representative of the structure of an evidence classifier including information pertaining to how an evidence classifier predicts a label for each unlabeled record.

The present invention provides a computer-implemented method, system, and computer program product for visualizing the structure of an evidence classifier. An evidence classifier visualization tool is provided that displays information representative of the structure of an evidence classifier. The evidence classifier visualization tool displays information pertaining to how an evidence classifier assigns labels to unlabeled records.

An evidence inducer generates an evidence classifier based on a training set of labeled records. Each record in the training set has one or more attribute values and a corresponding class label. Once the evidence classifier is built, the evidence classifier can assign class labels to unlabeled records based on attribute values found in the unlabeled records.

According to the present invention, the evidence inducer includes a mapping module that generates visualization data files used for visualizing the structure of the evidence classifier generated by the evidence inducer. In the present invention, an evidence visualization tool uses the visualization data files to display an evidence pane and/or a label probability pane. The evidence pane includes two different representations: a first evidence pane display view and a second evidence pane display view. The first evidence pane display view shows a normalized conditional probability of each label value for each attribute value. The second evidence pane display view shows relative conditional probabilities of a selected label value for each attribute value.

The label probability pane includes a first label probability pane display view and/or a second label probability pane display view. The first label probability pane display view shows prior probabilities of each label value based on the training set. The second label probability pane display view shows posterior probabilities of each label value based on at least one selected attribute value.

According to one embodiment, the first evidence pane display view comprises a plurality of rows of charts. Each row corresponds to a respective attribute. Each row has a number of charts, each chart in a row corresponding to a respective discrete attribute value. Each discrete attribute value can be a numeric or categoric attribute value or range of values (e.g., a bin). Each chart shows a normalized conditional probability of each label value for said respective attribute value.

In one preferred example, the first evidence pane display view includes a plurality of rows of pie charts. Each pie slice in a pie chart has a size which is a function of the normalized conditional probability of each label value for the respective attribute value. The evidence inducer calculates the normalized conditional probability of each label value (L) for the respective attribute value (A) according to the following conditional probability $P(A|L)$, normalized by dividing by a sum for all label values, $\Sigma P(A|L)$, where P is the conditional probability that a random record chosen only from records with label L takes the attribute value A; the conditional probability P being determined based on record counts made with respect to the training set. A mapping module then maps each calculated normalized conditional probability to a respective pie slice.

Each pie slice further has a pie slice graphical attribute, such as color, representative of a label. Each pie chart also has a pie chart graphical attribute that is a function of the number of records in the training set associated with the evidence classifier. In one example, the pie chart graphical attribute is height. For each pie chart, the mapping module maps a height that is a function of the number of records in the training set associated with the evidence classifier. In this way, a user can view heights of pie charts to determine the reliability of a classification.

The first label probability pane view comprises a chart that shows the prior probability for each label value. According to one preferred embodiment, the chart is a pie chart. Pie slices in the pie chart have sizes which are a function of the respective prior probabilities of label values. A prior probability of a label value is the proportion of records having the label value in the original data (training set). The evidence inducer calculates the prior probability for each label value by counting the number of records with a class label, counting the total number of records, and dividing the number of records with a class label count by the total number of records. The mapping module maps the calculated prior probabilities for each class label to define the sizes of respective pie slices.

The second evidence pane display view comprises a plurality of rows of bars. Each row corresponds to a respective attribute and each row has a number of bars. Each bar in a row corresponds to a respective discrete attribute value. Each bar further has a height that is a function of a conditional probability of a respective attribute value conditioned on a selected label value.

In one display mode, each bar height represents evidence for said selected label value. The evidence inducer calculates evidence for value, z, for each bar height based on a negative log of the quantity one minus the size of the slice matching said selected label in a corresponding pie chart in the evidence pane.

The mapping module maps the calculated evidence for values, z, to respective bar heights. In a second display mode, the evidence inducer calculates evidence against values, z', for each bar height based on a negative log of the size of the slice matching said selected label in a corresponding pie chart in the evidence pane. The mapping module maps the calculated evidence against, z', values to respective bar heights.

The second label probability pane display view comprises a chart that shows posterior probabilities of each label value based on at least one selected attribute value. In one preferred embodiment, the chart comprises a pie chart. Pie slices in the pie chart have sizes which are a function of the respective posterior probabilities of each label value based on at least one selected attribute value. Each pie slice in a pie chart has a size which is a function of the posterior probability of each label value for a respective attribute value. The evidence inducer calculates posterior probabilities of each label value based on at least one selected attribute value by multiplying probabilities of all attribute values with the prior probabilities of each label value. The mapping module maps the calculated posterior probabilities to sizes of pie slices.

According to one embodiment, the sum of the heights of pie charts or bars in each row in the evidence pane is constant. The distribution of pie chart or bar heights in each row represents a histogram showing the way records are distributed over the attribute values for each attribute. In a further feature, the evidence inducer provides binning to divide a continuous attribute into discrete bins having binning intervals such that class distributions in each bin are as different as possible.

According to a further feature of the present invention, an importance slider is displayed that permits a user to control the filtering of attributes based on the importance of the attributes to a classification of unlabeled records.

According to another feature of the present invention, a count slider is displayed that permits a user to set a low count threshold for filtering out attribute values having low counts. In this way, an evidence pane need not include charts or bars corresponding to attribute values having low counts less than the low count threshold set by the count slider.

In another feature of the present invention, the evidence classifier visualization tool allows a user to control sorting of attributes and attribute values by the evidence inducer. For example, a user can select to sort attributes alphabetically by name, by importance, or in the original order the attributes appear in a database. A user can select to sort attribute values within a row by alphabetic order for categorical attribute values, by confidence of an attribute value (e.g., record count), and by the conditional probability of an attribute value given a specific label value (e.g., the pie slice size for a selected label value).

According to a further feature of the present invention, a subtracting minimum evidence capability is provided. In this subtracting, for each attribute value, the evidence inducer determines a minimum height value representing an approximate minimum height over all label values. The evidence inducer then subtracts the determined minimum height value across all label values. In this way, small differences are magnified in bar heights in the second evidence pane display views for different selected label values.

According to the present invention, a user can select at least one pie chart corresponding to a selected attribute value. The second label probability pane display view is displayed that shows posterior probabilities of each label value based on at least one selected attribute value; thereby, imitating the evidence classifier behavior. The posterior probability is the expected distribution of label values given the combination of selected attribute value(s).

Further features and advantages of the invention, as well as the structure and operation of various embodiments of the invention, are described in detail below with reference to the accompanying drawings.

BRIEF DESCRIPTION OF THE FIGURES

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

FIG. 1 is a schematic diagram of a conventional training set, inducer, and evidence classifier.

FIG. 2 is a schematic diagram showing the operation of the evidence classifier shown in FIG. 1.

FIG. 3 shows example records in a training set.

FIG. 4 includes an evidence pane on the left and a label probability pane on the right showing evidence classifier information for an example iris database.

FIG. 5 shows the evidence pane and label probability pane of FIG. 4 when pies are selected in the evidence pane.

FIGS. 6 and 7 show an evidence pane and a label probability pane for an example mushroom database.

FIG. 8 shows Evidence For information displayed when a label is selected in the label probability pane of FIG. 4.

FIG. 9 shows Evidence Against information displayed when Evidence Against is selected in the evidence pane of FIG. 8.

FIGS. 10A and 10B are color drawings showing examples of evidence panes and label probability panes where nominal attribute values for a mushroom database are sorted.

FIGS. 11A to 11C are examples of evidence panes and label probability panes for a car database. FIG. 11A shows an evidence pane and a label probability pane for car data when no selection is made. FIG. 11B shows an evidence pane and a label probability pane having information for a selected pie chart. FIG. 11C shows Evidence For information displayed when a label is selected in the label probability pane of FIG. 11A.

Figure 4:
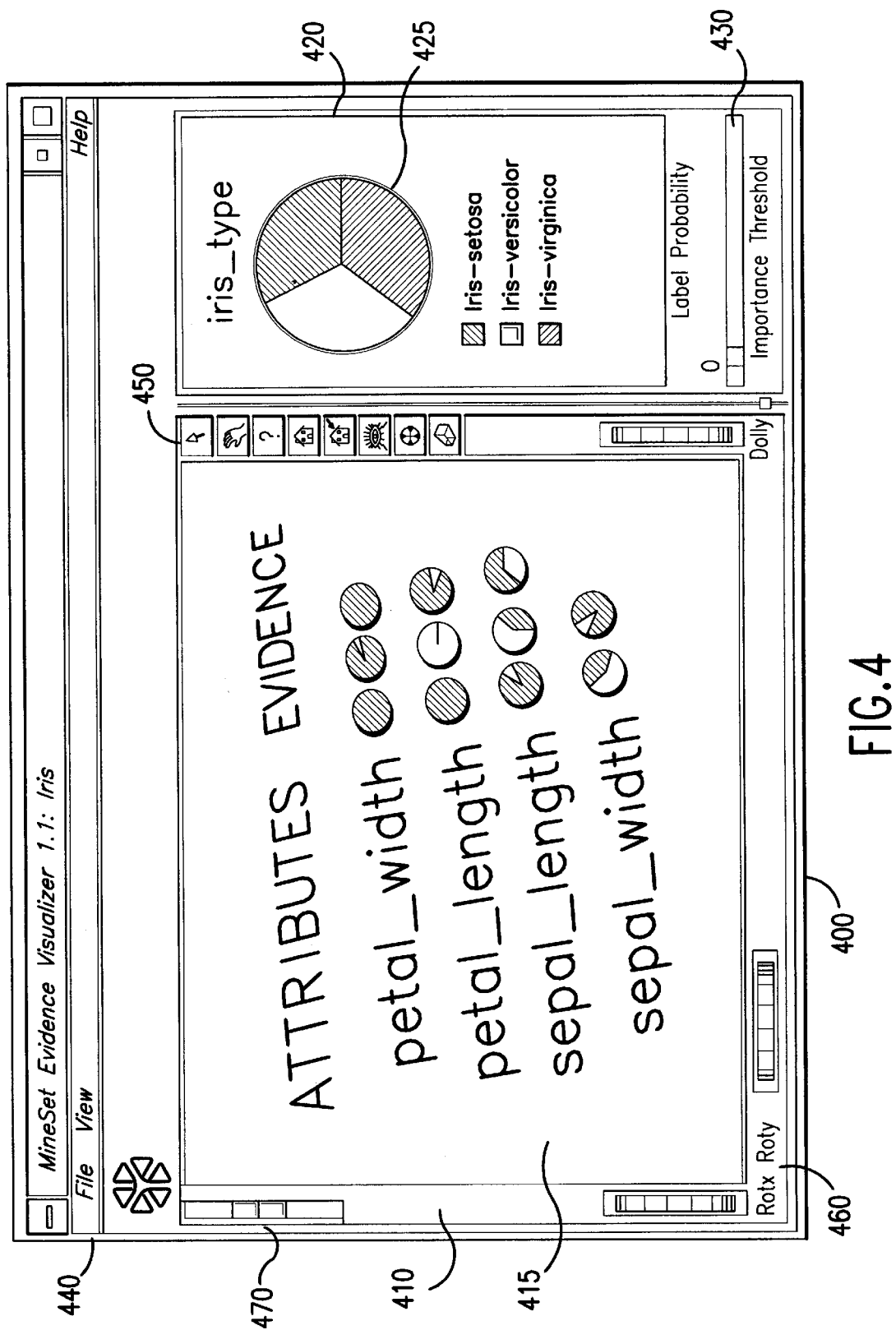
FIGS. 4, 5, 6, 7, 8, 9, 10A, 10B, 11A, 11B, and 11C show different displays of evidence classifier information illustrating the operation of an evidence classifier visualization tool according to one embodiment of the present invention.

The present invention is described with reference to the accompanying drawings. In the drawings, like reference numbers primarily indicate identical, structurally similar, and/or functionally similar elements. Additionally, the left-most digit(s) of a reference number identifies the drawing in which the reference number first appears.

DETAILED DESCRIPTION OF THE PREFERRED EMBODIMENTS

1. Overview of the Invention

The present invention is directed to an evidence classifier visualization tool, also called an evidence visualizer, for visualizing the structure of an evidence classifier. The evidence visualizer helps a user understand the importance of specific attribute values for classification. Also, the evidence visualizer can be used to gain insight into how the classification is done, and to answer "what if" questions.

For example, the evidence visualizer provides display views that visually show the likelihood that a new record has a certain label given one or more known selected attribute values. The evidence visualizer provides display views that show values of an attribute which are most useful for classifying a label. The distribution of records by attribute value is also shown. The evidence visualizer further provides display views that show characteristics of records that have a certain label and the probability that an attribute takes on a certain value given that it has a specific class label.

According to one preferred embodiment, an evidence inducer generates an evidence classifier based on a training set of labeled records. A mapping module generates visualization data files. An evidence visualization tool uses the visualization data files to display an evidence pane and/or a label probability pane.

A first evidence pane display view shows a normalized conditional probability of each label value, for each attribute value. The first evidence pane display view can be a plurality of rows of pie charts. Each pie slice in a pie chart has a size which is a function of the normalized conditional probability of each label value for the respective attribute value. For each pie chart, the mapping module maps a height that is a function of the number of records in the training set associated with the evidence classifier.

A second evidence pane display view shows relative conditional probabilities of a selected label value, for each attribute value. The second evidence pane display view can be a plurality of rows of bars. Bar height is a function of a conditional probability of a respective attribute value conditioned on the selected label value. Bar heights can represent Evidence For a selected label value or Evidence Against a selected label.

A first label probability pane display view shows a pie chart of prior probabilities of each label value based on the training set. A second label probability pane display view shows a pie chart of posterior probabilities of each label value based on at least one selected attribute value. To imitate evidence classifier behavior, a user can select at least one pie chart corresponding to a selected attribute value within the evidence pane. The second label probability pane display view is then displayed to show posterior probabilities of each label value based on the at least one selected attribute value.

According to further features of the present invention, an importance slider controls filtering of attributes based on the importance of the attributes to a classification of unlabeled records. A count slider controls filtering of attribute values based on the number of counts. The evidence classifier visualization tool further provides sorting of attributes and attribute values. A subtracting minimum evidence capability is provided.

2. Terminology

"Evidence classifier" and "Bayes classifier" are used interchangeably to refer to a classifier based on the Bayes rule, approximations of the Bayes rule, or any other modification of the Bayes rule. Under the Bayes rule, attributes are assumed to be conditionally independent by the evidence classifier in determining a label. This conditional independence can be assumed to be a complete conditional independence. Alternatively, the complete conditional independence assumption can be relaxed to optimize classifier accuracy or further other design criteria. Thus, an evidence classifier can include, but is not limited to, a Naive-Bayes classifier or Simple Bayes classifier that assumes complete conditional independence.

"Record" refers to any type of data record or file having at least one attribute. Records can be provided by any data source, such as, a database, flat file, or direct user input.

"Conditional probability" of each label value for a respective attribute value is the conditional probability that a random record chosen only from records with a given label value takes the attribute value.

"Prior probability" of a label value is the proportion of records having the label value in the original data (training set).

"Posterior probability" is the expected distribution of label values given the combination of selected attribute value(s).

3. Example Environment

The present invention is implemented in a computer graphics display tool environment. The evidence classifier visualization tool of the present invention can be implemented in software, firmware, hardware, and any combination thereof, on a computer system. The evidence classifier visualization tool can be provided on any type of computer system, such as a computer graphics workstation, processor, multiprocessor system, computer network, personal standalone computer, or any other computer graphics processing environment or application, including, but not limited to, the example data mining network system described below with reference to FIG. 13; the example computer system described below with reference to FIG. 16; and the MineSet™ data mining product, version 1.0 and 1.1 products, manufactured by Silicon Graphics, Inc. as described in MineSet™ User's Guide,. Silicon Graphics, Inc., Mountain View, Calif., 1996 (incorporated herein by reference).

The present invention is described in terms of an example computer graphics display tool environment. Description in these terms is provided for convenience only. It is not intended that the invention be limited to application in this example environment. In fact, after reading the following description, it will become apparent to a person skilled in the relevant art how to implement alternative environments of the invention.

4. Evidence Classifier Visualization Tool Embodiment a. Evidence Classifier Visualization Displays FIGS. 4, 5, 6, 7, 8, 9, 10A, 10B, 11A, 11B, and 11C show different displays of evidence classifier information illustrating the operation of an evidence classifier visualization tool according to one embodiment of the present invention. The evidence classifier data visualization tool displays the structure of an evidence classifier. As described below with respect to FIG. 12, the evidence classifier data visualization tool includes an evidence inducer. The evidence inducer generates an evidence classifier based on a training set of labeled records. Each record has one or more attribute values and a corresponding class label. The evidence classifier assigns class labels to unlabeled records based on attribute values found in the unlabeled records. A mapping module generates visualization data files that define the display views provided in display 400, as described with respect to FIGS. 4 to 11C.

FIG. 4 shows a screen display 400 of an evidence classifier visualization tool according to one embodiment of the present invention. Screen display 400 includes an evidence pane 410 and a label probability pane 420. Evidence pane 410 and label probability pane 420 show evidence classifier structure information relating to the classification of an example iris database, such as that described with respect to FIG. 3.

Evidence pane 410 shows a first evidence pane display view 415. First evidence pane display view 415 shows a normalized conditional probability of each label value, for each attribute value. In one preferred example shown in FIG. 4, first evidence pane display view 415 includes a plurality of rows of pie charts for each attribute value. Each pie slice in a pie chart has a size which is a function of the normalized conditional probability of each label value for the respective attribute value.

The normalized conditional probabilities depicted by the pie charts in first evidence pane display view 415 show the relative probability of each attribute value given (conditioned on) each class label. The size of a pie slice indicates the amount of evidence the classifier being visualized adds to the prior probability after taking into account a given attribute value in a record. Thus, a label corresponding to a large pie slice (>50% of the pie chart) is more likely to be predicted by the evidence classifier given the attribute value represented by the pie chart (assuming the class for the label does not have a very low prior probability). If the size of the pie slices within a pie chart are approximately equal, then a user knows the attribute value is less important or irrelevant to a classification, as the classifier adds the same amount of evidence to all classes.

Each pie slice further has a pie slice graphical attribute, such as, color, representative of a label. Each pie chart has a pie chart graphical attribute, such as, height, that is a function of the number of records in the training set associated with the evidence classifier. To generate each pie chart, then, an evidence inducer counts the number of records in the training set associated with the evidence classifier and a mapping module maps the count to a pie chart height value. In one example, when the label values are orderable, then the evidence inducer uses a continuous color spectrum to assign colors.

According to one embodiment the sum of the heights of pie charts in each row is constant. The distribution of pie chart heights in each row represents a histogram showing the way records are distributed over the attribute values for each attribute. In this way, a user can view heights of pie charts to determine the reliability of a classification.

Color and height are only examples of graphical attributes and are not intended to limit the present invention. In general, any graphical attribute can be used for a pie slice graphical attribute or a pie chart graphical attribute including, but not limited to, color, opacity, dimension, size, text, shape, and texture.

In FIG. 4, four iris attributes are listed in four rows (petal_width, petal_length, sepal_length, and sepal_width). Each row has one or more pie charts. A separate pie chart is provided for each attribute value or binned range of values. For example, the petal_width attribute has three pie charts. Because petal-width is a continuous numeric attribute, values are automatically binned.

According to a feature of the present invention, continuous numeric attribute values are binned into ranges, i.e, bins, which maximize differences between adjacent pie charts. For clarity and economy of space, attribute values are not shown under the pie charts for these familiar data sets, since the attribute values for a pie chart of interest can be seen in a legend above evidence pane 420. Of course, the present invention is not limited to this option. Attribute values can be displayed near each pie chart, in a separate table or view panel or in any other display format.

For this example iris database, three labels are possible: iris-setosa, iris-versicolor, and iris-virginica. Therefore, as mentioned above, each pie slice in a pie chart in evidence pane 410 has a size which is a function of the normalized conditional probability of each label value for the respective attribute value. The evidence inducer calculates the normalized conditional probability of each label value for the respective attribute value according to the following conditional probability $P(A|L)$, normalized by dividing by a sum over all label values, $\Sigma P(A|L)$, where P is the conditional probability that a random record chosen only from records with label L takes the attribute value A. The conditional probability P being determined based on record counts made with respect to the training set. For example, if there are 36 records with label iris-versicolor and 33 of them have a petal-width attribute value in a range (0.75–1.65), then the conditional probability $P(A|L)=P(0.75<\text{petal width}<1.65)$ |iris-versicolor)=91.6. A mapping module then maps each calculated normalized conditional probability to a respective pie slice.

Each pie slice further has a pie slice graphical attribute, such as, color, representative of a label. For example, green slices denote iris-setosa, yellow slices denote iris-versicolor, and red slices denote iris-virginica. Each pie chart has a pie chart graphical attribute, such as, height, that is a function of the number of records having that specific attribute value in the training set associated with the evidence classifier.

Label probability pane 420 includes a first label probability pane display view 425 that shows prior probabilities of each label value based on the training set. In FIG. 4, first label probability pane display view 425 is a pie chart for an iris_type label (iris-setosa, iris-versicolor, or iris-virginica). Each pie slice has a pie slice graphical attribute, such as, color, representative of a label. For example, a green slice denotes iris-setosa, a yellow slice denote iris-versicolor, and a red slice denote iris-virginica.

Each pie slice has a size proportional to the prior probability of a respective label value as calculated with respect to the training set. The prior probability for each class label, as depicted in a pie chart in first label probability pane display view 425, is the probability of seeing a label in the data for a randomly chosen record, ignoring other attribute values. Mathematically, the prior probability for a label (iris-setosa, iris-versicolor, or iris-virginica) is the number of records having the class label divided by the total number of records in a training set (iris database set). In the pie chart shown in the label probability pane 420, each slice has an approximately equal size indicating that an unlabeled record has an approximately equal chance of being classified by the evidence classifier into one of the three labels: iris-setosa, iris-versicolor, and iris-virginica.

According to a further feature of the present invention, an importance slider 430 is also included in screen display 400. Importance slider 430 can be a slider, as shown, or alternatively, any other type of control input means, including, but not limited to, thumb wheels, dials, buttons, and menus. Importance slider 430 permits a user to control the filtering of attributes based on the importance of the attributes to a classification of unlabeled records.

Importance is a measure of the predictive power with respect to a label. For example, an evidence inducer can; assign an importance value in a range from 0 to 100. As slider 430 is shifted away from zero toward the right-hand side of display 400, attributes that fall below the importance slider value are removed from display view 415. If attributes are sorted by importance, then attributes at the bottom of the sort are removed first.

Height scale slider 470 scales the height of pie charts in the first evidence pane display view 415. Height scale slider 470 also scales the heights of bars in a second evidence pane display view described further below with respect to FIGS. 8 and 9. In this way, the height scale slider 470 can be adjusted by a user to magnify small differences.

Figure 10A:
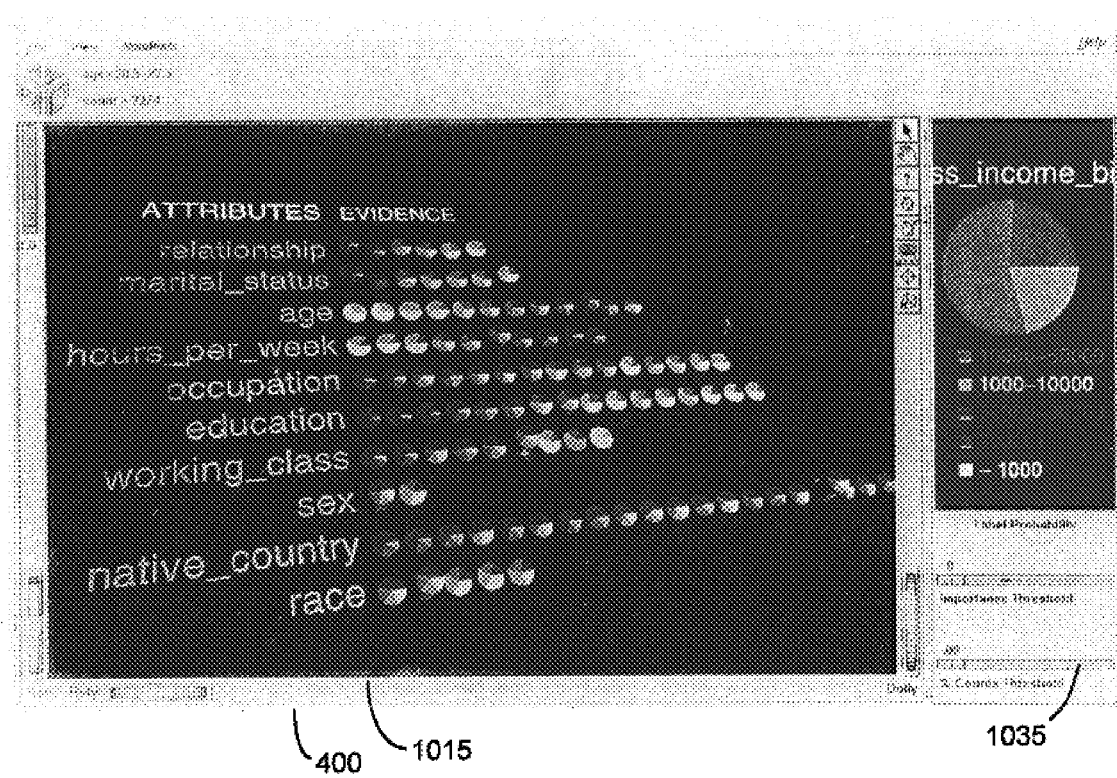
Figure 10B:
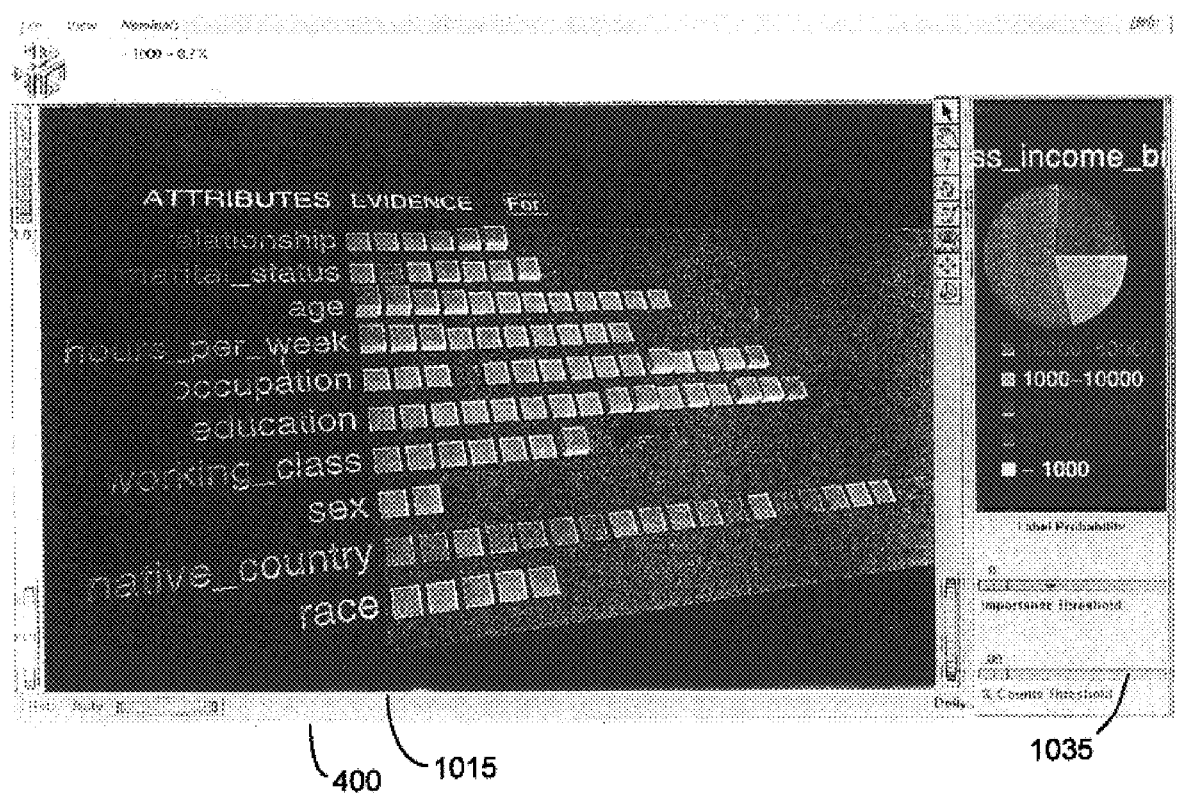

According to another feature of the present invention, shown in FIGS. 10A and 10B, a count slider 1035 can be used. Count slider 1035 allows a user to control a low count threshold, and, thereby, filter out attribute values having relatively low record counts. This threshold determines which attribute values are included in the first and second evidence pane display views 1015, 1016, namely, only those attribute values which are included in a percentage of records that equals or exceeds the threshold set by slider 1035. In this way, less meaningful and less statistically significant attribute values, and pie charts and bars therefor, do not have to be included in the evidence pane 410. Once low count attribute values are removed, the sum of heights of the pie charts in a single row for an attribute is no longer constant.

In FIG. 4, other external controls surround the evidence pane 410. These external controls consist of an array 450 of eight viewer buttons (Arrow, Hand, Viewer Help, Home, Set Home, View All, Seek, and Perspective) and a set 460 of three thumb wheels (Rotx, Roty, and Dolly).

Arrow puts a user in select mode for both evidence pane 410 and label probability pane 420. When in select mode, the cursor becomes an arrow. Select mode lets a user highlight, or select, entities in the evidence pane 410 or select labels in the label probability pane 420.

Hand puts a user in a grasp mode for both evidence pane 410 and label probability pane 420. When in grasp mode, the cursor becomes a hand. Grasp mode lets a user rotate, zoom, and pin the display in evidence pane 410, or pin and zoom in label probability pane 420.

Viewer Help brings a help window describing the viewer for the evidence visualization tool. Home takes a user to a designated location. Initially, this location is a first view point shown after invoking the evidence visualizer and specifying configuration file. If a user has been working with the evidence visualizer and has click the Set Home button, then clicking the Home button returns a user to the view point that was current when the Set Home was last clicked. Set Home makes a user's current location the home location.

View All lets the user view the entire graphic display of the first evidence pane display view 415, keeping the angle of view a user had before clicking the View All option. To get an overhead view of the scene, a camera can be rotated so that a user looks directly down on the entities, then the View All can be clicked.

Seek takes the user to the point or object a user selects after the Seek button is clicked. Perspective is a button that lets the user view a scene in evidence pane 410 in 3-D perspective. In other words, closer objects appear larger and further objects appear smaller. Clicking Perspective again turns 3-D perspective off.

The set 460 of three thumb wheels allow a user to dynamically move a camera view point. Rotx and Roty thumb wheels rotate a scene about an x or y axis, respectively. Dolly thumb wheel moves a camera view point forward or backward, that is, closer or further away from a scene in evidence pane 410 When Perspective is off, the Dolly thumb wheel becomes a zoom-thumb wheel. Mouse controls (not shown) allow further interaction with a display view.

Control bar 440 has three pull-down menus (File, View, and Help) that access the evidence classifier visualizer tool functions. File menu lets a user open a new configuration file, reopen a current configuration file, or exit the evidence visualizer. View menu lets a user control certain aspects of what is shown in evidence pane 410.

View menu contains three options: Show Window Decoration, Sort By Importance, and Subtract Minimal Evidence. Show Window Decoration lets a user hide or show the external controls around evidence pane 410.

Sort By Importance lets a user control sorting of attributes and/or attribute values. For example, a user can select to sort attributes alphabetically by name, by importance, or in the original order the attributes appear in a database. A user can select to sort attribute values within a row by alphabetic order for categorical attribute values, by confidence of an attribute value (e.g., record count), and by the conditional probability of an attribute value given a specific label value (e.g., the pie slice size for a selected label value as described below with respect to FIGS. 10A and 10B). The evidence inducer sorts attributes and/or attribute values automatically based on a default or Sort By Importance setting.

According to one sort feature, nominal attribute values are sorted based on conditional probability. As a result, pie charts and bars for a nominal or categoric attribute are displayed in a sorted order. In particular, pie charts for a common nominal valued attribute are ordered by the sizes of slices for a particular label. A Nominal menu option is provided to allow a user to select and deselect sorting of nominal attribute values. See, for example, the rows of sorted pie charts for the nominal-valued attributes taken from census data, such as, relationship, martial status, in the first evidence pane display view 1015 shown in FIG. 10A. Likewise, FIG. 10B like shows rows of sorted bars for the nominal-valued attributes taken from census data, such as, relationship, martial status, in a second evidence pane display view 1016.

According to a further feature of the present invention, a subtracting minimum evidence capability is provided. In this subtracting, for each attribute value, the evidence inducer counts records to determine a minimum height value representing an approximate minimum height over all label values. The evidence inducer then subtracts the determined minimum height value across all label values. In this way, small differences are magnified in bar heights in second evidence pane display views for different selected label values.

Figure 5:
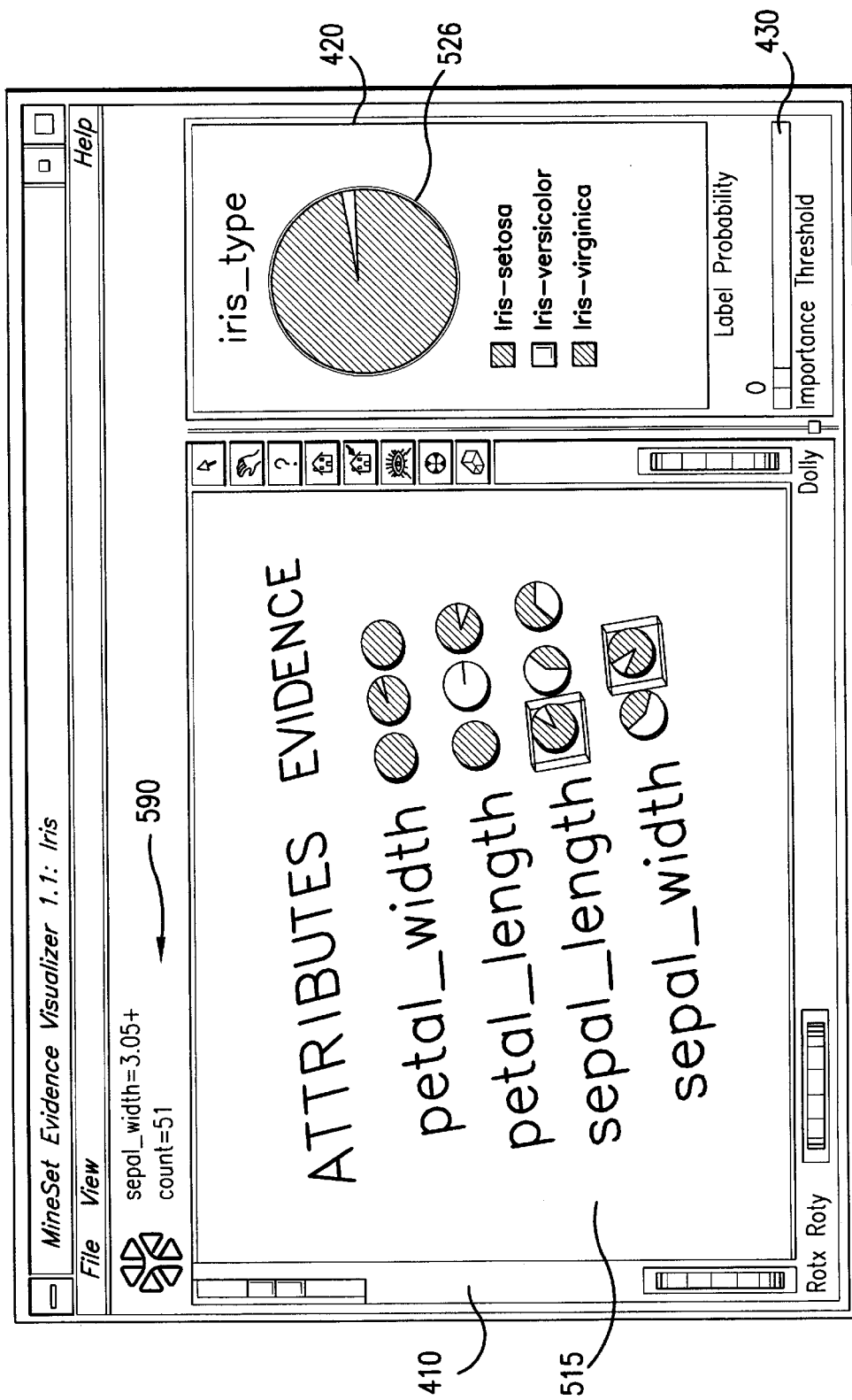

Subtract Minimal Evidence in the View Menu applies only when a label has been selected and the bars are shown, as described in further detail with respect to FIG. 5. With this option on, the height that is the minimal over all label values is subtracted. This amount may be different for each value of each attributes, but for a given attribute value, the amount subtracted is constant across label values. In this way, by selecting the subtract minimal evidence function option, a user can magnify small differences by subtracting the least common denominator among the labeled values.

Help menu has five command options (Click for Help, Overview, Index, Keys & Shortcuts, Product information, and MineSet™ User's Guide). Click For Help command turns a cursor into a question mark. Placing the cursor over an object in the main display window 400 and clicking a mouse causes a help screen to appear. This help screen contains information about the selected object. Closing the help window restores the cursor to its arrow form and deselects the help function.

Overview command provides a brief summary of the major functions of the data visualization tool, including how to open a file and how to interact with the resulting display view. Index command provides an index of the complete help system. Keys and Shortcuts command provides keyboard shortcuts for all of the data visualization tools functions that have accelerator keys. Product Information command brings up a screen with the version number and copyright notice for the evidence classifier visualization tool currently being executed. User's Guide allows a user to browse a user guide describing operation of the evidence classifier visualization tool.

FIG. 5 shows screen display 400 when attribute values are selected. Evidence pane 410 has a first evidence pane display view 515 with two pie charts selected. In particular, a box is displayed around each selected attribute value to highlight the selection. In FIG. 5, the two attribute values, sepal_length less than 5.45 and sepal_width greater than 3.05 are selected.

In FIG. 5, label probability pane 420 includes a second label probability pane display view 526. The second label probability pane display view 526 includes a pie chart having pie slices representing posterior probabilities for each class given the selected attribute values. Posterior probabilities represent products of the prior probabilities of all labels, as described above with respect to the first label probability pane display view 425, and the conditional probabilities of the selected attribute values in the first evidence pane display view 515. For example, the large red slice in the pie chart of second label probability pane display view 526 shows that an iris with these selected characteristics, that is, an iris with the selected attribute values, sepal length less than 5.45 inches and the pie chart for sepal width greater than 3.05 inches, belongs almost certainly to the class iris-setosa according to the evidence classifier predictive structure.

Thus, the process of classification can be done interactively by a user using the evidence classifier visualization tool. A user simply selects one or more pie charts corresponding to known attribute values being investigated in the first evidence pane display view 515, and then observes the resulting second label probability pane display view 526 to determine the posterior probabilities for each class label given the known selected attribute values. An evidence inducer can calculate the posterior probability values by multiplying the prior probabilities by the conditional probabilities of the selected attribute values. The final product gives the posterior probability for each class with the highest value being the predictive class label output by the evidence classifier. The final product values generated by the evidence inducer can be mapped by a mapping module to form the appropriate pie slices.

For improper or disallowed combinations of selected attribute values, the pie chart in label probability pane 420 turns completely gray. This occurs when the values selected are contradictory according to the evidence classifier model. For example, in an iris data base there are no iris flowers that have a petal width less than 0.75 inches and petal length greater than 4.85 inches. Thus, selecting two pie charts from the first evidence pane display view 515 representing these two contradictory attribute values results in a gray pie chart being displayed in label probability pane 420.

When a cursor is positioned over an attribute value, a legend 590 is displayed within display 400. Legend 590 displays characteristics of the attribute value over which a cursor arrow pointer is positioned. In this case, legend 590 shows that the cursor is positioned over a pie chart representing a sepal_width attribute value>3.05. Legend 590 further indicates that the pie chart has a height corresponding to a count of 51 records.

In this way, the evidence visualization tool of the present invention (also called the evidence visualizer) provides valuable insight into the importance of each attribute value in effecting the class value as described with respect to FIGS. 4 and 5.

Figure 6:
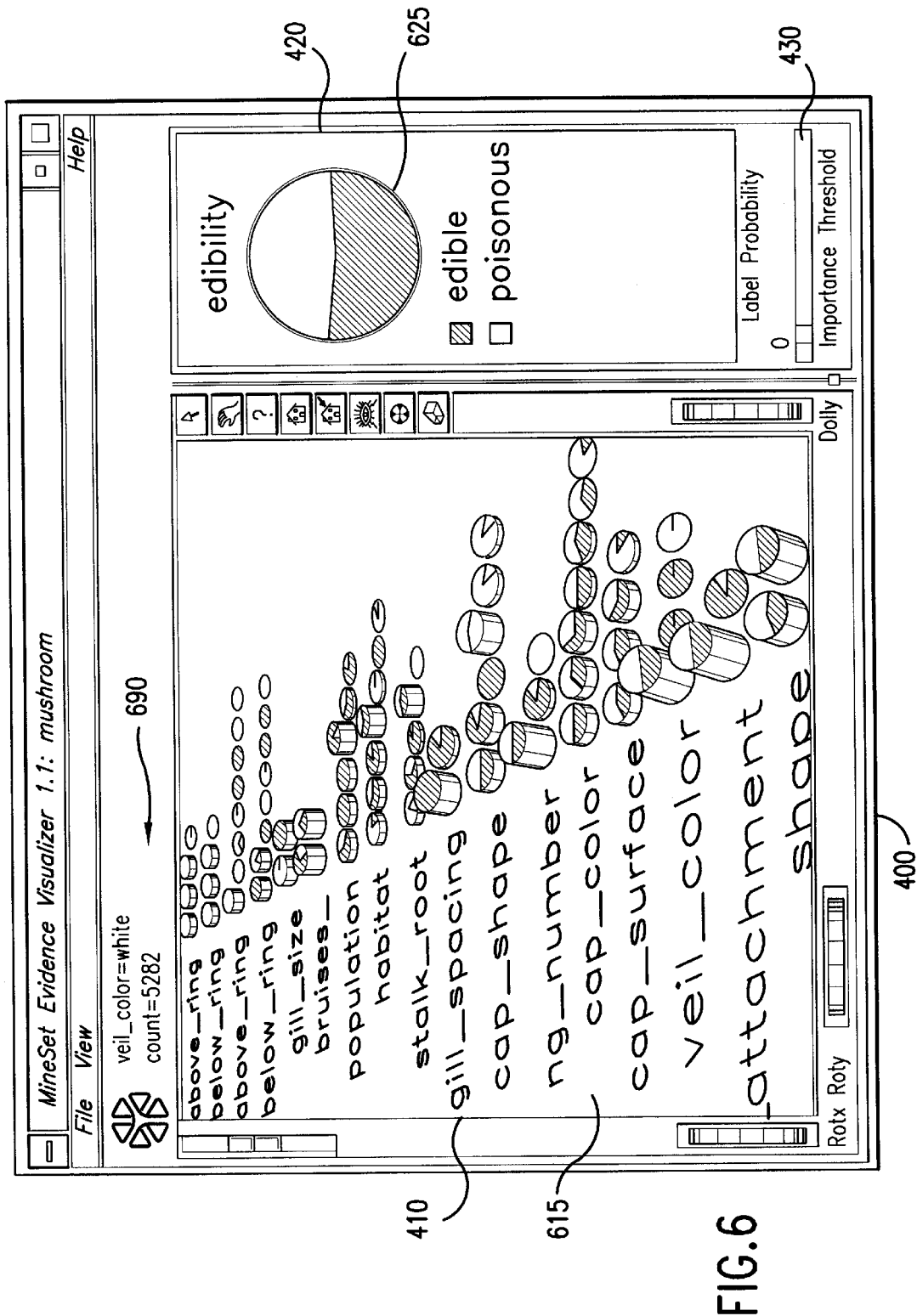
Figure 7:
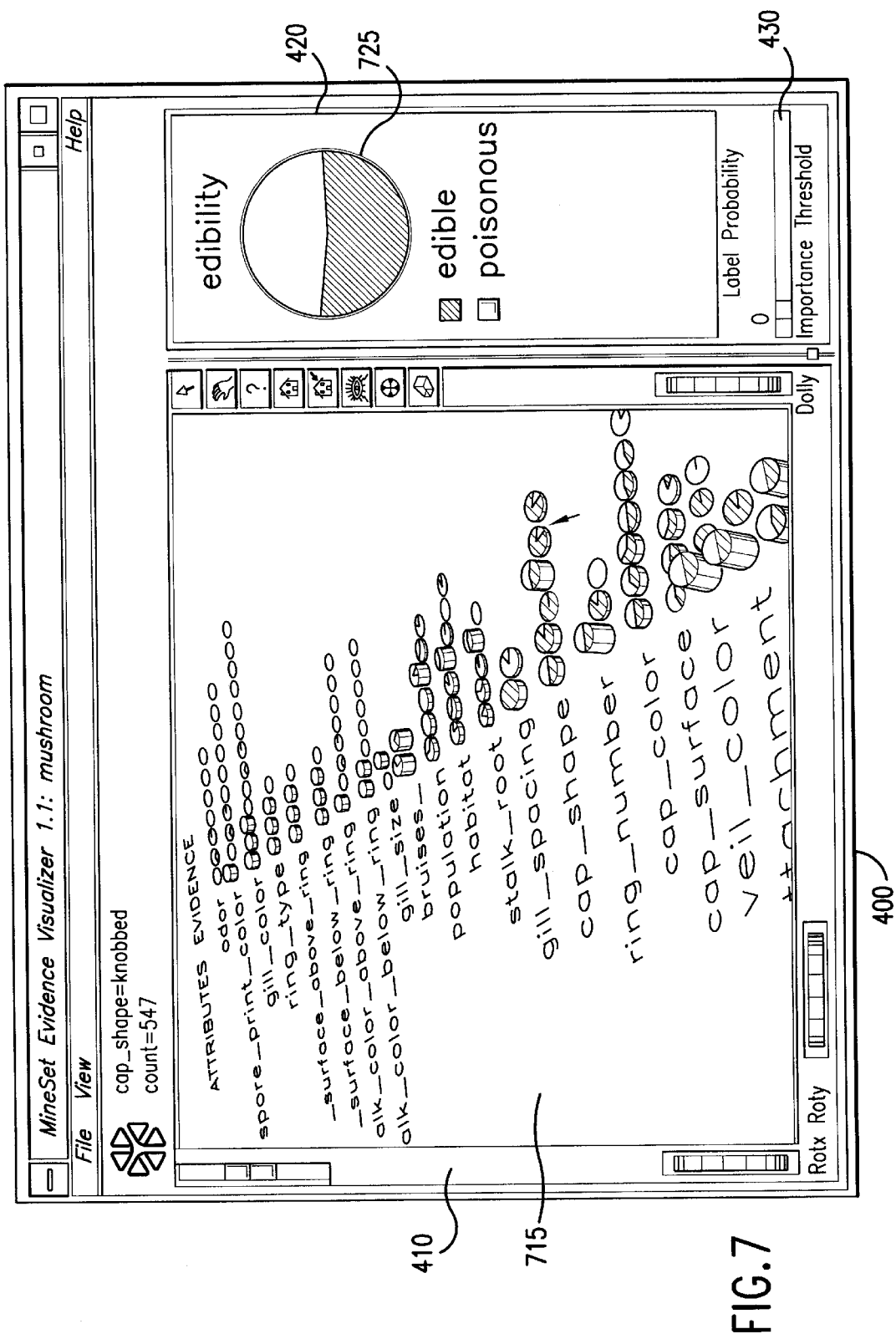

The evidence classifier visualization tool also provides valuable insight into the importance of specific attribute values as described below with respect to a mushroom data set (FIGS. 6 and 7). FIG. 6 shows screen display 400 that includes a first evidence pane display view 615 and a first label probability pane display view 625 based on a mushroom data set. FIG. 7 shows a second display 400 that includes a first evidence pane display view 715 and a first label probability pane display view 725 based on the mushroom data set. In this example mushroom data set, the goal of the evidence visualizer is to understand which mushrooms are edible and which ones are poisonous. Each mushroom has many characteristics, including cap color, bruises, odor, and veil color. Data used in a mushroom sample file is found in *Audubon Society Field Guide to North American Mushrooms*, Alfred A. Knopf, New York (1981).

By viewing the first evidence pane display view 615, a user can determine that the veil color attribute is not very important. The veil color attribute has four attribute values (white, brown, orange, and yellow) represented by the respective four pie charts. Most of the time the veil-color attribute value is white as indicated by the first tall pie chart. Label 690 further shows that data for the veil-color white attribute pie chart is based on 5282 records. The tall pie chart of the white attribute value further indicates that for a white veil color, the evidence classifier is almost equally likely to predict an edible or a poisonous mushroom. Thus, by viewing row of pie charts for the veil-color, a user can readily see that the veil-color attribute does not add much evidence to either an edible or a poisonous class. However, if the veil color is brown or orange, the mushroom is likely to be edible as shown by the pie charts having large edible pie slices. If a veil color is yellow, the mushroom is likely to be poisonous as shown by the large poisonous pie slice.

As mentioned above with respect to the Sort By Importance option, the evidence classifier data visualization tool also can order attributes by importance (that is, usefulness in predicting the label). In the first evidence pane display view 715 in FIG. 7, odor appears at the top of the list, thereby, indicating that the odor attribute is most important in determining whether a mushroom will be classified as edible or poisonous. In other words, for the odor attribute, the distribution in the pie charts is most different between attribute values for the attributes. For odor, the pie charts show that six attribute values correspond to a nearly certain poisonous label and three attribute values correspond to a nearly certain edible label. In this way, a user can easily read the displayed list of sorted attributes in evidence pane display view 715 to learn which attributes (and attribute values) are important to an evidence classifier in predicting a label type.

The evidence visualizer lets a user see specific values that might be critical, even if the attribute itself is not always important. Almost all values are good discriminators to varying degrees (even though odor is the most important attribute with a importance of 92 and all other attributes have importance less than 48). If there is no odor, then there is a mix of both classes, edible and poisonous. For example, the stalk_color_below_ring attribute is not a good discriminatory attribute, because most of the time it takes on the value white. A white stalk_color_below_ring value offers no predictive power because there are equal amounts of eatable and poisonous mushrooms with this value, as evident from viewing the pie charts. The stalk_color_below_ring attribute values gray or buff, however, provide excellent discrimination for an edible or poisonous mushroom label, but there are very few mushrooms with these values, as evident from the low height pie charts.

Importance threshold slider 430 can be moved to filter the number of attributes shown in the first evidence pane display views 615 and 715. If the sliders are moved to the right, the attributes for the lowest importance are removed from the scene.

Evidence For/Evidence Against

Figure 8:
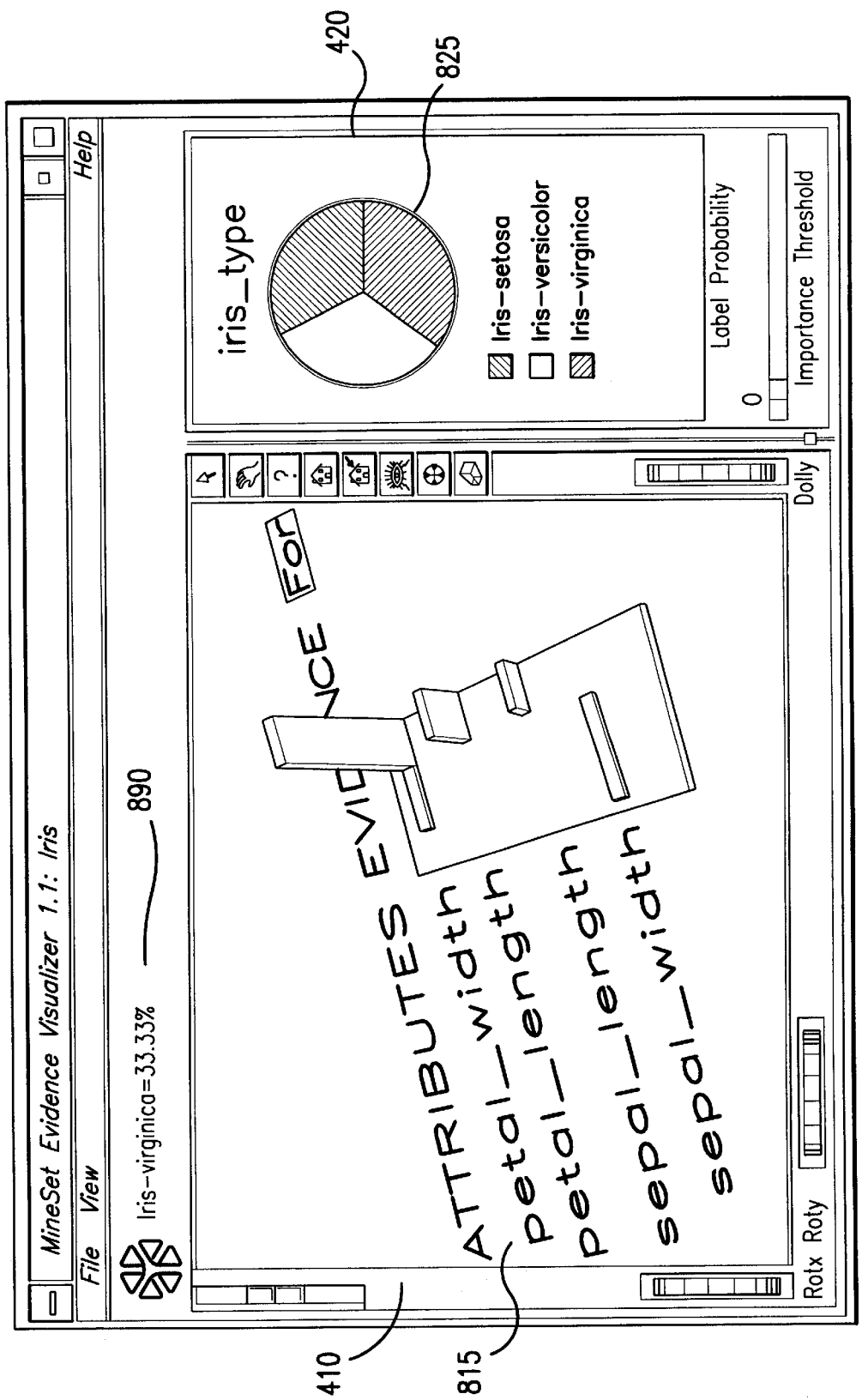
Figure 9:
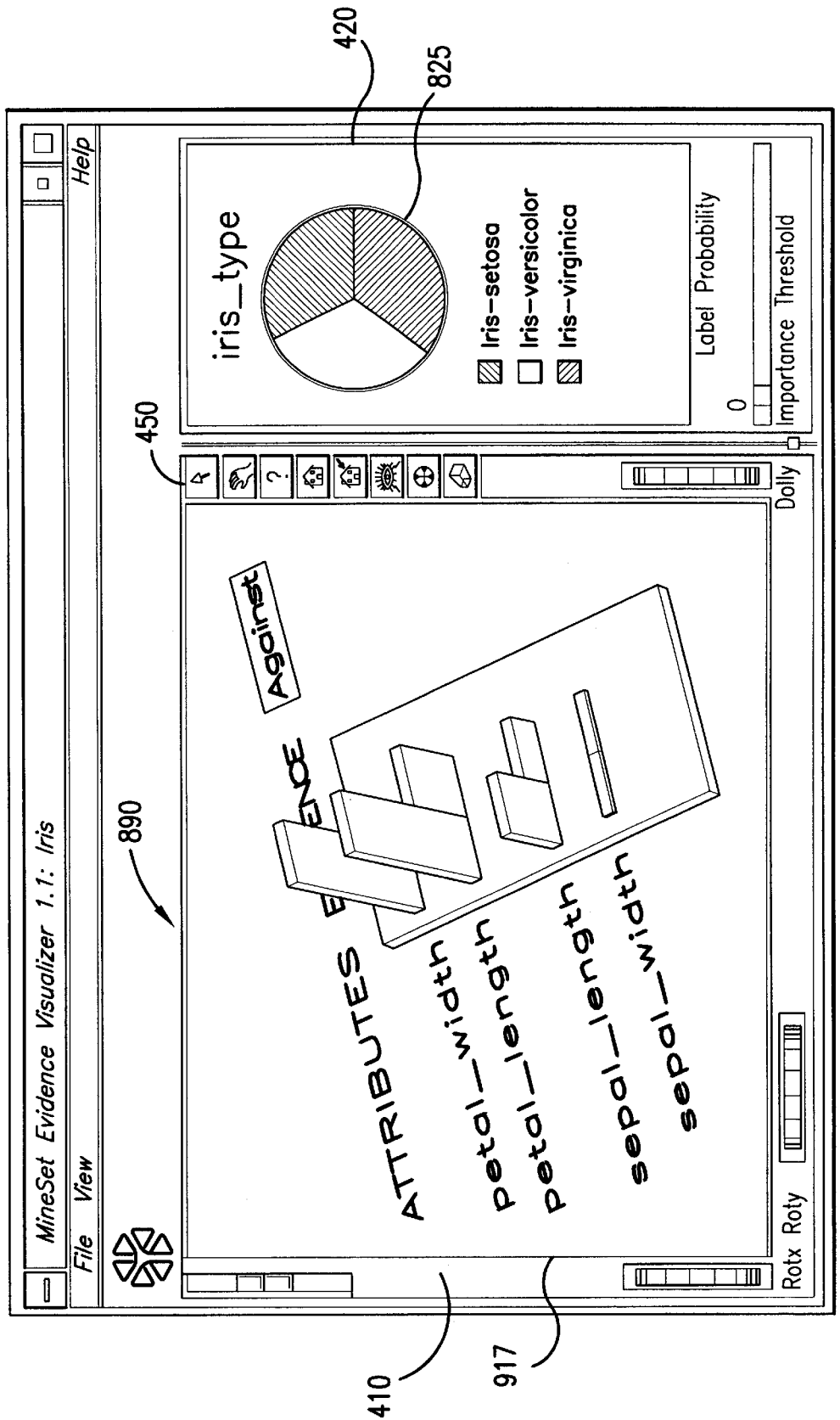

According to a further feature of the present invention, the evidence classifier visualization tool further displays evidence for and evidence against a particular class label. As shown in FIGS. 8 and 9, a user can select a label in the label probability pane 420. A white box appears around a button next to a selected label (i.e., iris-virginica) in the first label probability pane display view 825.

When a label is selected, a first display mode of a second evidence pane display view 816 appears in evidence pane 410. In the first display mode, second evidence pane display view 816 shows rows of attributes with bars for each attribute value. The height of each bar represents evidence for the selected label value. In one embodiment, evidence for is the negative logarithm of the quantity 1 minus the size of the pie slice matching the selected label in the corresponding pie chart of an attribute value in the first evidence pane display view 415. Mathematically, an evidence for value, z, can be defined by the following equation:

$$z = -\log\left[1 - \frac{P(A|L)}{\sum_{i=1}^{N} P(A|L_i)}\right]$$

where P is the relative conditional probability that a random record chosen only from records with a selected label L takes the attribute value A. N is the number of label values.

Evidence for can be useful in determining which attribute values are most helpful in predicting a particular label value. The amount of evidence (e.g., bar height) depends on the conditional probability relative to the other probabilities for all the other labeled values according to the above equation.

Second evidence pane display view 816 includes a box marked For to identify that the bars shown represent Evidence For information. Clicking on the box For, toggles to a second display mode, an Evidence Against display, as shown in FIG. 9. FIG. 9 shows display 400 having a second evidence pane display view 917 showing evidence against a selected iris-virginica label. In this case, the bar heights change to show evidence against the iris-virginica label. Evidence against is the negative log of the size of the slice matching the selected label and the corresponding pie chart of the first evidence pane display view 415. Mathematically, an evidence against value, z', can be defined by the following equation:

$$z' = -\log\left[1 - \frac{P(A|L)}{\sum_{i=1}^{N} P(A|L_i)}\right]$$

where P is the relative conditional probability that a random record chosen only from records with a selected label L takes the attribute value A. N is the number of label values.

As a default, the amount of evidence common to all labels is subtracted in evidence for and evidence against display views. This means that the height of a bar for each value is reduced by the height representing the label for which the evidence is smallest. If a user selects a different label, the bars and bar colors change to represent a new class label. Selecting the same label again deselects it, and the evidence pane 410 again displays the pie charts of the first evidence pane display view 415.

As with the pie charts in the first evidence pane display view 415, a cursor can be moved over the bars to highlight information about bars in a legend over the second evidence pane display view 816. If the cursor is moved over a bar, then the message displayed in a legend takes the following format:

(<attribute>=<value>)==>Conditional Probability (<selected label>)=x % confidence interval [low %-high %];

Evidence=z or z';

<selected label>==>Conditional Probability (<attribute>= <value>)=y % confidence interval [low %-high %].

Figure 11A:
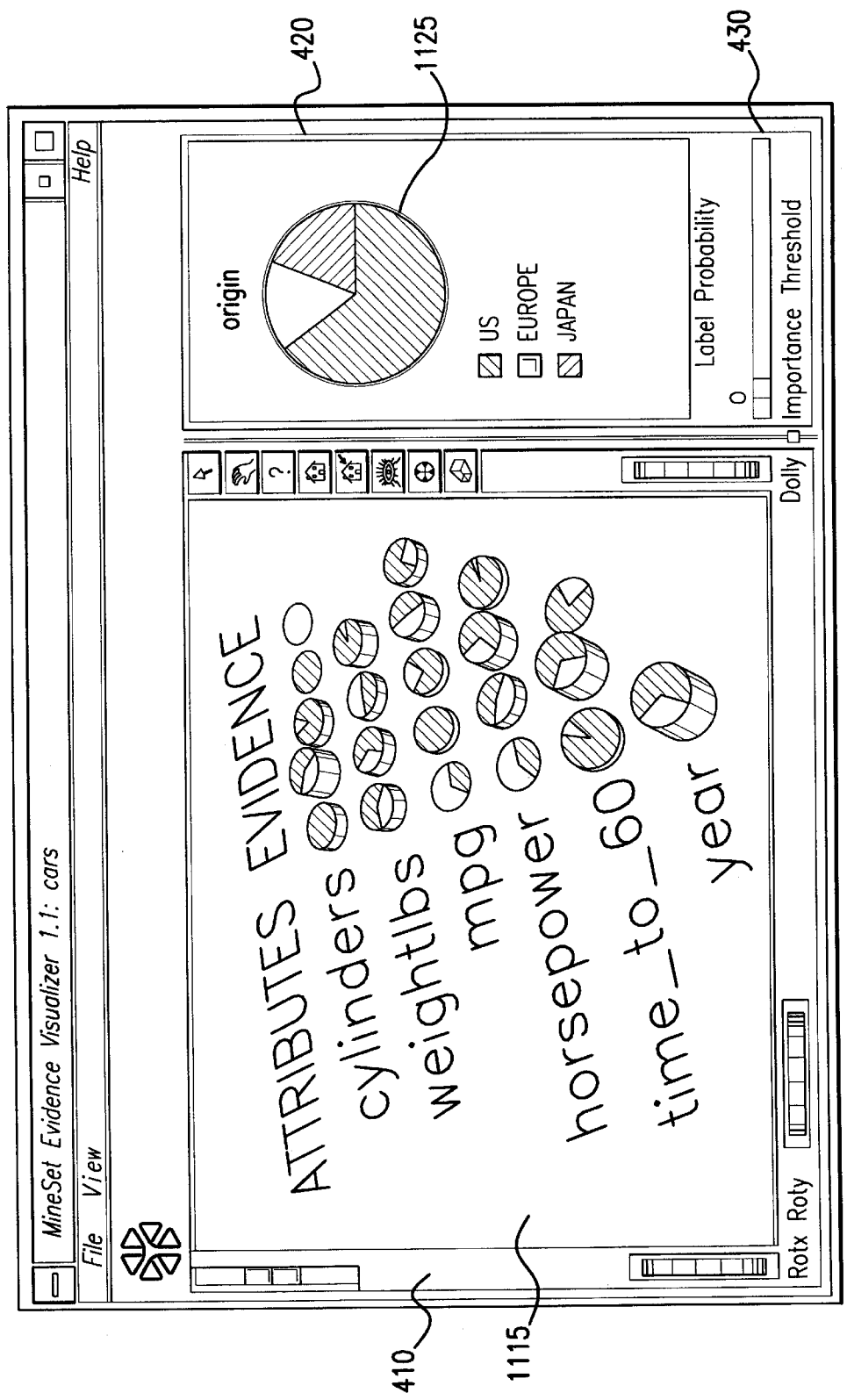
Figure 11B:
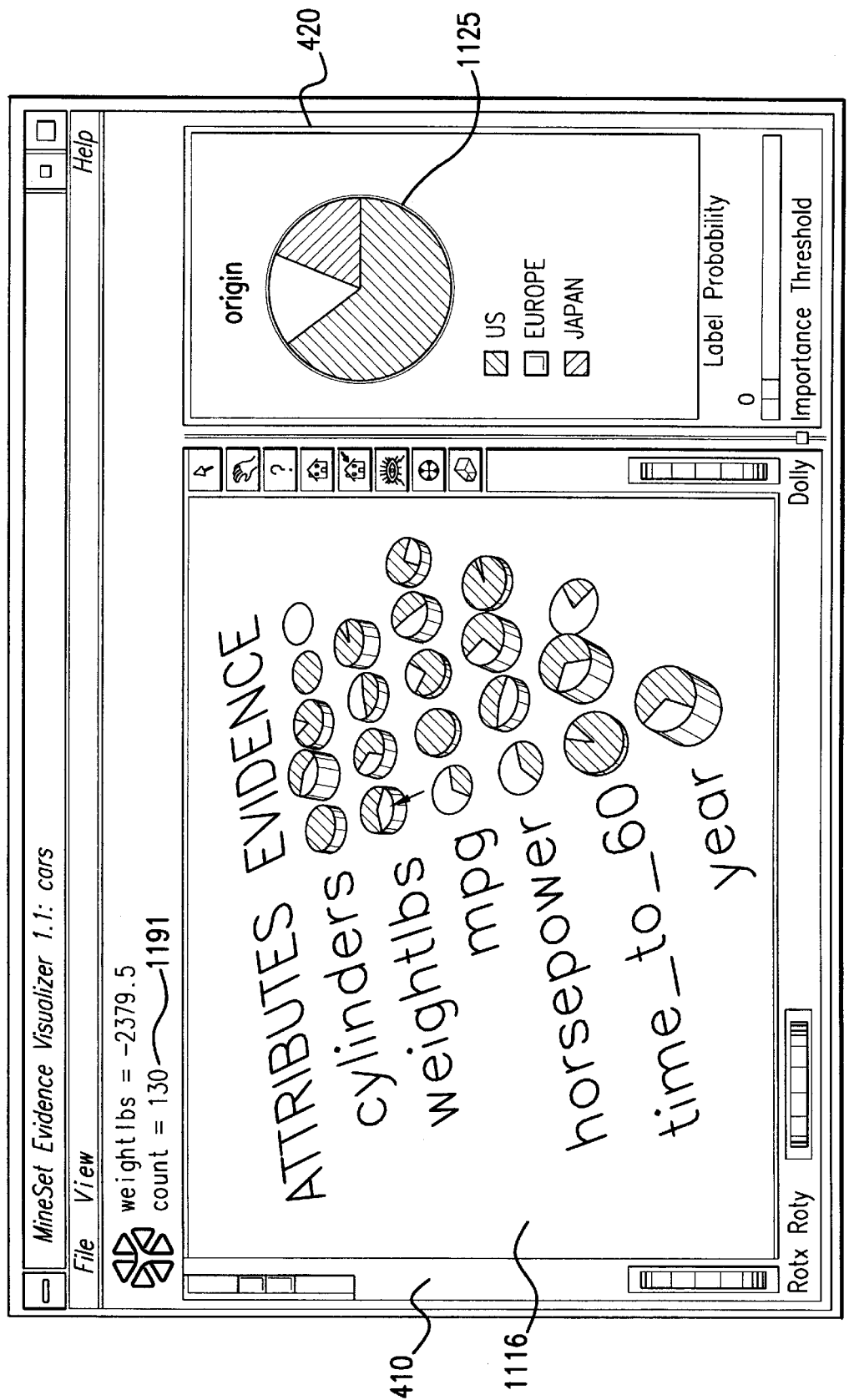
Figure 11C:
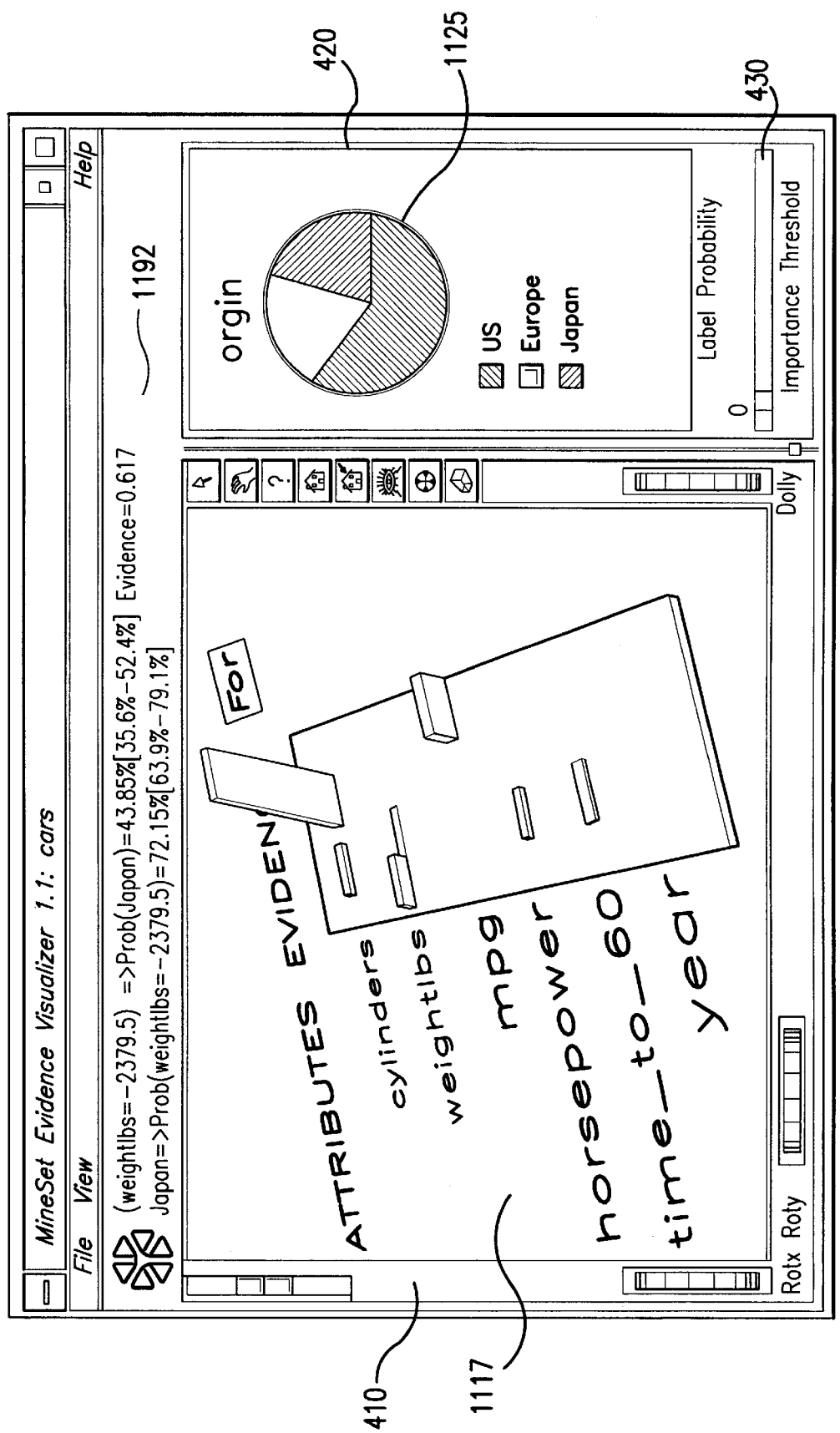

See, for example, legend 1192 in FIG. 11C.

According to a further option, the height of the gray rectangular base on which the bars stand in FIGS. 8 and 9 represents a minimum amount of evidence for or against contributed by the prior probability for all attribute values. In this way, individual bars need only represent an additional amount of evidence for or against contributed by a respective attribute value. The total evidence for or against being represented by the height of a bar and the minimum amount of evidence for or against that the base represents.

According to a further feature, the color of bars in the second evidence pane display views 816, 917 is a function of the number of record counts for the corresponding attribute values. For example, the color of bars can progress from white toward grey to visually indicate bars drawn for attribute values with relatively high and low record counts. Alternatively, bar color can be determined based on the confidence interval. Large confidence intervals are assigned a color closer to a grey color.

Selecting bars has the same effect on the pie chart in the label probability pane 420 as did selecting pie charts in the first evidence pane display view 415. In other words, selecting a bar causes a second label probability pane display view to be displayed. The bar height indicates the amount of evidence for or against the selected label contributed by that selected attribute value. Since log probabilities are used to represent evidence, the bar heights are added to accumulate evidence (where as probabilities must be multiplied).

According to the present invention, the evidence classifier data visualization tool can be run on any type of data for any data set. For example, census data, DNA data sets, and medical diagnosis and diseases data can be used.

C. Car Database Example

FIGS. 11A to 11C show different screen displays obtained when the evidence classifier data visualization tool having all of the features, described in detail above, is run on a cars data set. This car data set contains information about different models of cars from 1970–1982. Attributes include car weight, acceleration, miles per gallon, cylinders, horsepower, and acceleration time from 0 to 60. In this example, a user may want to know what characterizes cars of different origin (U.S., Europe, or Japan).

FIG. 11A shows a display view 400 having a first evidence pane display view 1115 and a first label probability pane display view 1125. As described above with respect to the example iris data set, the first evidence pane display view 1115 includes one row of pie charts for each attribute in the car data set that the evidence classifier is using. Each pie chart in display view 1115 corresponds to an attribute value or binned range of values. Each pie slice has a size proportional to a normalized conditional probability of a respective car label value (U.S., Europe, Japan) as calculated with respect to the car data set. Each pie slice further has a pie slice graphical attribute, such as color, representative of a label. For example, a green slice denotes U.S., a yellow slice denotes Europe, and a red slice denotes Japan. A pie chart graphical attribute, height, is a function of the number of records having an attribute value.

From looking at the first evidence pane display view 1115, a user can determine, among other things, that U.S. cars generally have six or eight cylinders (see the first two leftmost pie charts in the cylinders attribute row), low miles per gallon (see the second pie chart from the left in the miles per gallon attribute row), high horsepower (greater than 122, see the three leftmost pie charts in the horsepower attribute row), and fast acceleration (see the first and second leftmost pie charts in the time to 60 attribute row). By looking at the heights of the pies for the cylinder attribute (which has five pies corresponding to eight or more cylinders, six cylinders, four cylinders, three cylinders, and two or less cylinders), it can be seen that most cars have four, six or eight cylinders and that eight cylinder cars are of U.S. origin.

In the pie chart shown in the first label probability pane display view 1125, each pie slice has a size indicating the prior probability of the label (U.S., Europe, or Japan). Again the color of the slices corresponding to the color associated with a representative class label (U.S., Europe, or Japan).

The pie chart in label probability pane display view 1125 then shows to the user a prior probability distribution associated with the class labels. In particular, the pie chart shows that the evidence classifier will classify a car as being of U.S. origin approximately 70% of the time. The evidence classifier will classify a car as being of Europe or Japan origin approximately 15% of the time.

FIG. 11B shows the screen display 400 when a pie chart with a first binned range of weight less than 2,379.5 lbs. is highlighted by positioning the cursor in a first evidence pane display view 1116. Legend 1191 shows the information related to the highlighted pie chart. In particular, legend 1191 shows that the leftmost pie chart corresponds to the attribute value weight lbs. less than 2,379.5 lbs. and a record count equal to 130, meaning that 130 records in the data set contain weight lbs. attribute values of less than 2,379.5.

FIG. 11C shows a second evidence pane display view 1117 that appears showing evidence for a selected label value (Japan). The bars represent evidence for a car being Japanese. By observation, a user can quickly learn that three cylinders strongly indicates that a car is Japanese, as shown by the very tall bar in the second evidence pane display view 1117. The height of the corresponding pie chart for three cylinders in the first evidence pane display view 1115, however, indicates very few records (3 records) were included in the training set for 3 cylinder cars of any origin. This provides the user with further information regarding the reliability of the evidence classifier for this attribute value and selected label value.

FIG. 11C further shows an example legend 1192 showing information on a particular selected bar. Legend 1192 shows that the weight lbs. attribute bar positioned under the arrow cursor corresponds to the weight lbs. attribute value less than 2,379.5 lbs. The conditional probability that the car is of Japanese origin given a weight lbs. attribute value of less than 2,379.5 is 43.85% with a confidence interval of 35.6 to 52.4%. The evidence for value, z, is 0.617. The posterior probability that a record has the highlighted attribute value weight lbs. less than 2,379.5 given the Japanese selected label value is 72.15% with a confidence interval of 63.9% to 79.1%. Evidence value z=0.617 is directly related to the bar height and can be summed in order to determine which class is predicted.

b. Evidence Classifier Visualizer System

Figure 12:
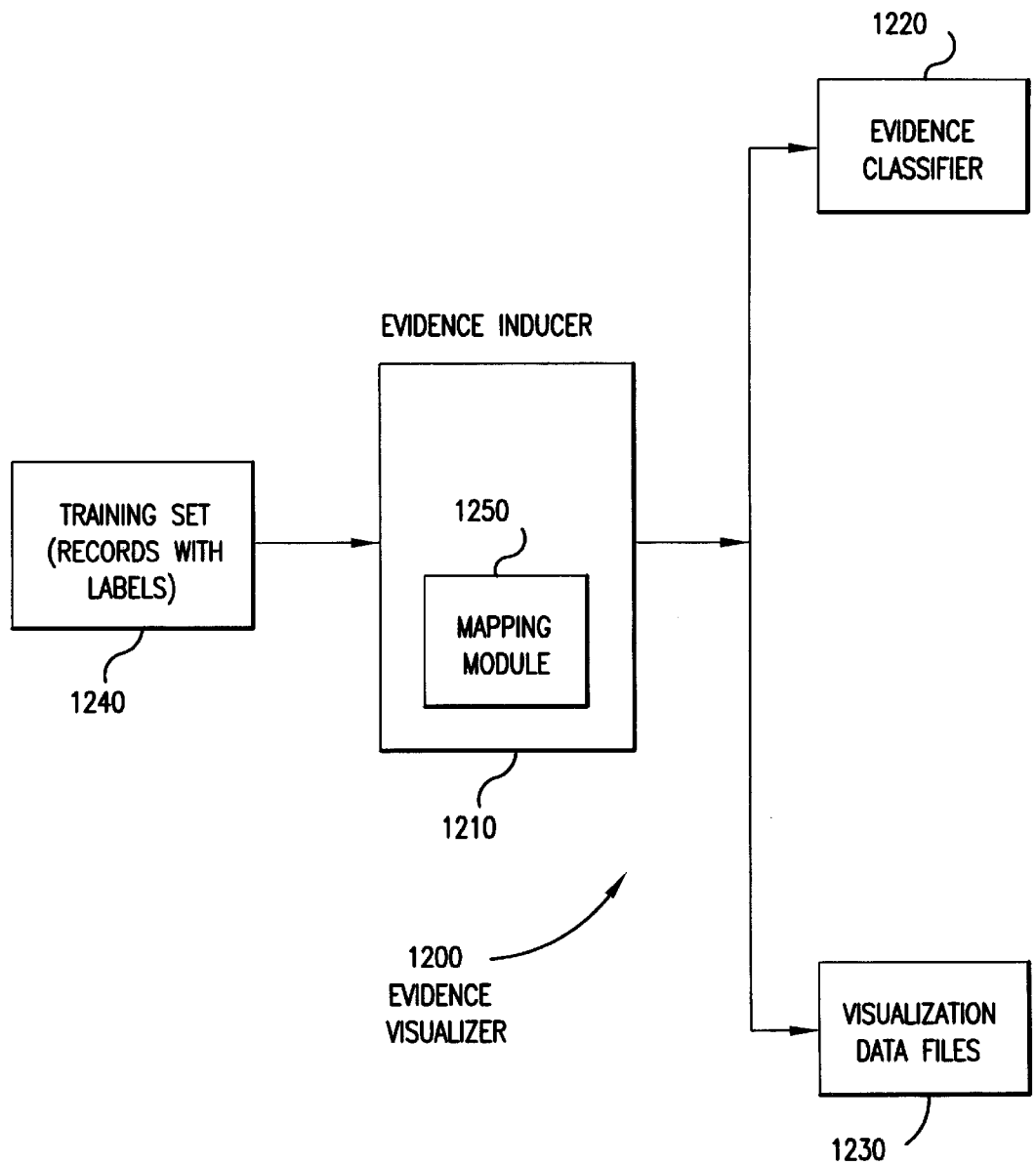
FIG. 12 is a schematic diagram showing a system for visualizing an evidence classifier, according to the present invention.

FIG. 12 is a schematic diagram showing an evidence visualizer 1200 for visualizing an evidence classifier, according to the present invention. Evidence inducer 1210 constructs evidence classifier 1220 based on a training set 1240. Evidence inducer 1210 further includes mapping module 1250. Mapping module 1250 generates visualization data files 1230 for use in an evidence classifier visualization tool, as described above with respect to FIGS. 4 to 11C.

Figure 13:
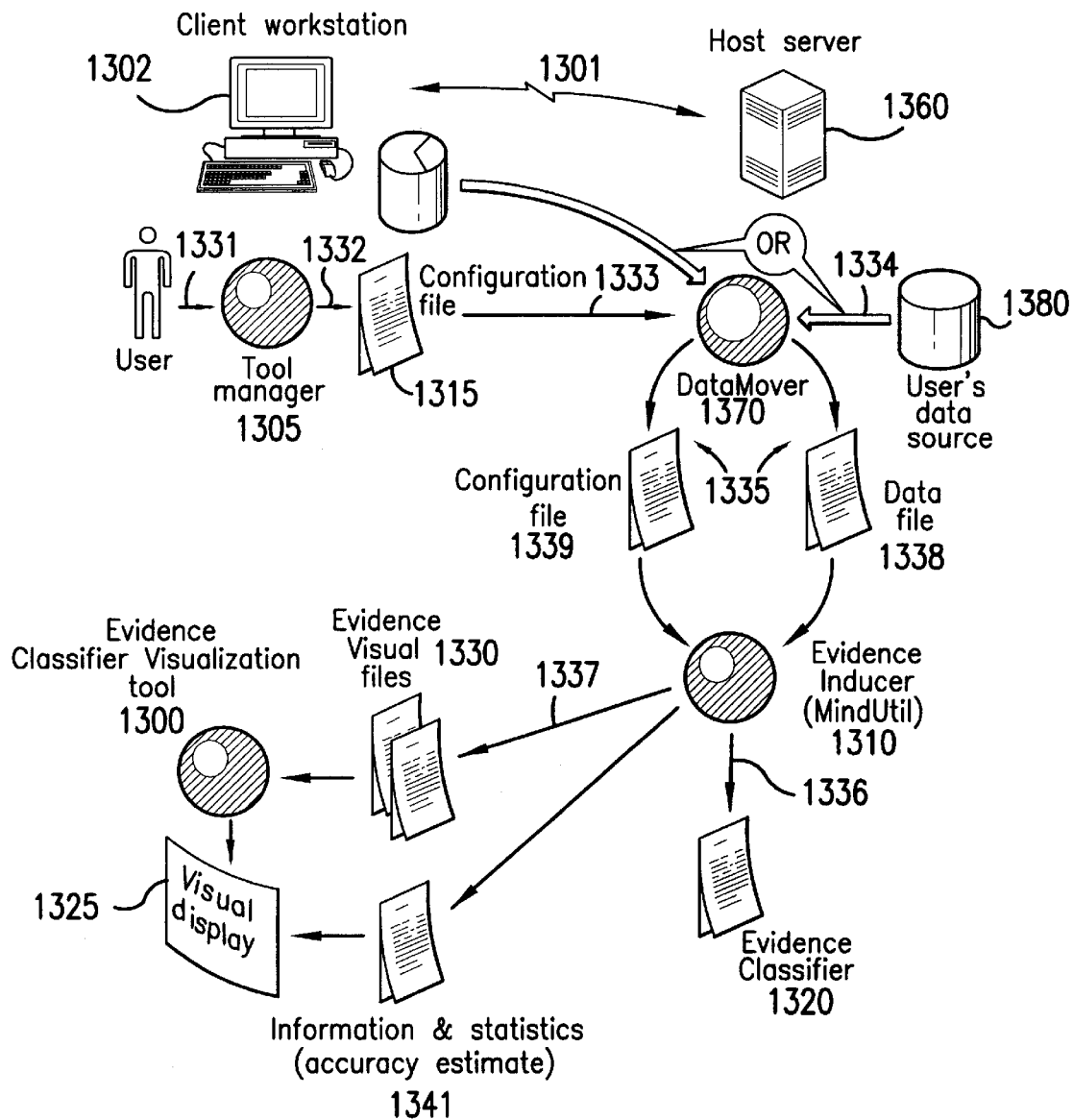
FIG. 13 shows an example client/server network implementing the visualization tool of FIGS. 4 to 11C.

FIG. 13 shows an example client/server network implementing evidence visualizer 1200. A client workstation 1302 communicates over a data link 1301 with a host server 1360 as part of a local area network (LAN), intermediate-area network, wide-area-network (WAN), or other network type configuration. Any data communication protocol can be used to transport data.

The client workstation 1302 includes a computer system. For example, the computer system can be, but is not limited to, computer system 1600 as described below with respect to FIG. 16. Workstation 1302 runs a tool manager 1305 for managing operation of evidence classifier visualization tool 1300. Visual display 1325 is coupled to evidence classifier visualization tool 1300 for providing graphical-user interface inputs and outputs to evidence classifier visualization tool 1300, as described above with respect to FIGS. 4 to 11C.

In one preferred embodiment, tool manager 1305 and evidence classifier visualization tool 1300 are software algorithms executed on workstation 1302. Host server system 1360 includes a host processor and a data source 1380. Data mover 1370 and evidence inducer 1310 are included at the host server 1360, and preferably, are implemented in software executed by the host server 1360.

FIG. 13 further illustrates the flow of an evidence classifier visualization tool execution sequence through steps 1331–1339. First, a user logs onto the client workstation 1302 and opens tool manager 1305 (step 1331). Through the tool manager 1305, the user can select and configure evidence classifier visualization tool 1300. A configuration file 1315 must be set-up which identifies the content to be displayed in a data visualization and appropriate external dimension ranges. To facilitate this process, predefined preference panels, templates and/or data palettes can be accessed through menu-driven commands and pop-up display windows to permit the user to easily define the content of an evidence classifier visualization.

At the host server 1360, data mover 1370 extracts data from the data source 1380 corresponding to the configuration file 1315 (step 1334). A configuration file 1339 and data file 1338 are made available to evidence inducer 1310 by data mover 1370 (step 1335). Evidence inducer 1310 generates evidence classifier 1320 (step 1336). Evidence inducer 1310 generates evidence visualization data files 1330 for use and further modification by evidence classifier visualization tool 1300 (step 1337). Evidence inducer 1310 also generates an information and statistics report file 1341 for display.

Figure 14:
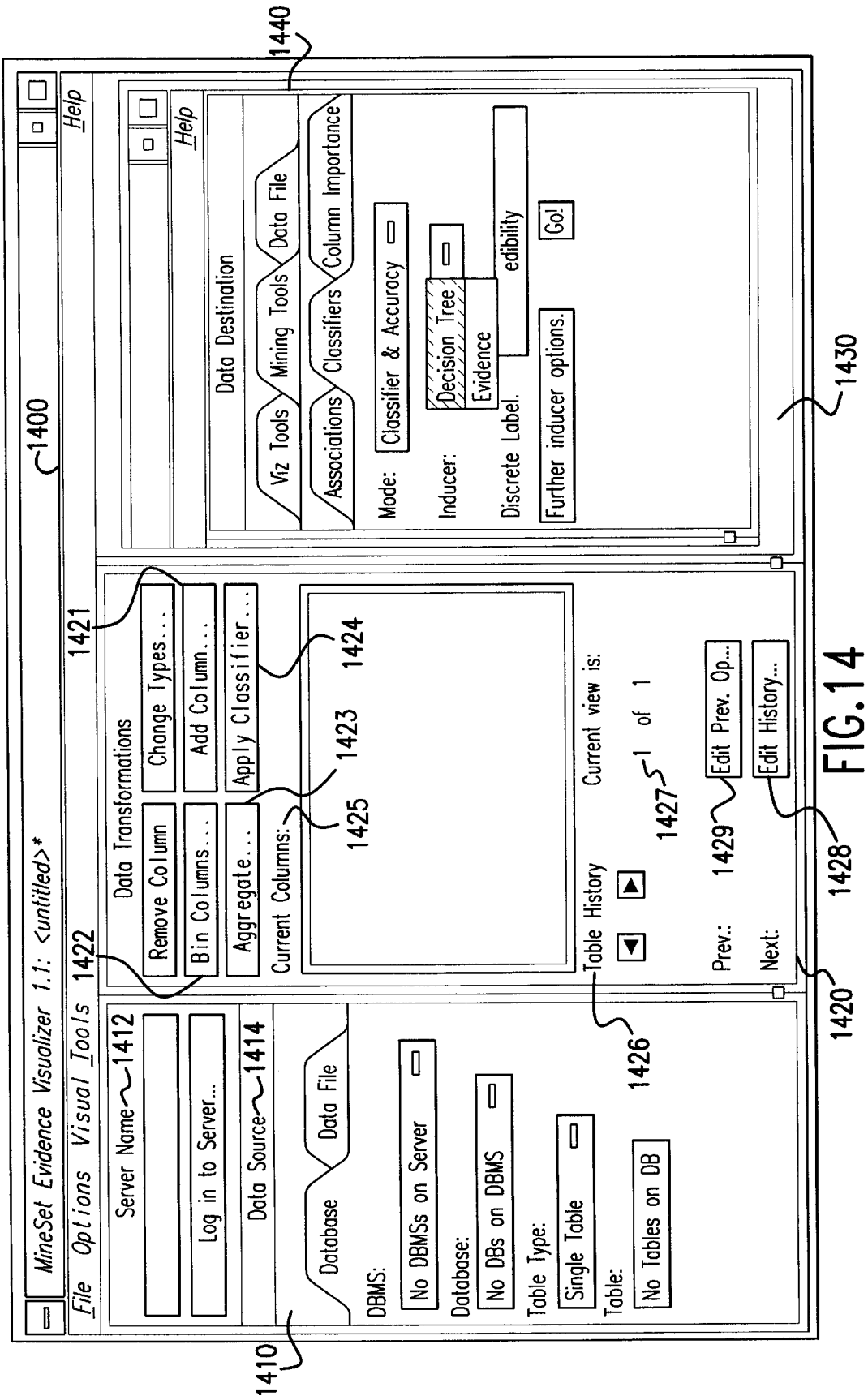
FIG. 14 shows a data transformation and destination panel for defining an evidence inducer according to the present invention.

According to a further feature of the present invention, a graphical-user-interface is used to provide parameters for defining training set 1240 and setting evidence inducer options (FIGS. 14–15). The graphical user-interface for data transformation is provided in tool manager 1305.

FIG. 14 shows a data panel 1400 having data manipulation panels 1410, 1420, 1430 that permit a user to construct a configuration file 1315 by defining mapping requirements for data. For brevity, only main functions of panels 1410–1430 are described here. Other functions can be added as would be obvious to one skilled in the art given this description.

In panel 1410, server name window 1412 identifies a server name containing data to be analyzed. Data source window 1414 identifies particular database management systems, databases and data files to used in an evidence classifier visualization.

Data record transformation panel 1420 is used to define data transformations to be performed on the data to define a training set 1240 before running evidence inducer 1210, 1310. Most operations are applied to columns of data. For example, Add Column option 1421 lets a user create a new column based on other columns. Bin Columns option 1422 is a data transformation where numerical values in a column are grouped into ranges, e.g., grouping ages into 5-year age groups. Other data transformation operations can be performed including aggregating data, and applying a classifier (options 1423, 1424). See, co-pending U.S. patent application, Rathmann et al., "Method, System, and Computer Program Product for Computing Histogram Aggregations," filed Mar. 11, 1997 (Appl. Ser. No. 08/815, 473) (incorporated herein by reference).

Current Columns window 1425 lists the columns available to be included in training set 1240. Initially, this is the set of columns in the original data. The selected data transformations can add, remove, or modify one or more columns.

Successive data transformations form a "history." The Table History arrow buttons 1426 let a user move back and forth in this history. Current Columns window 1425 and Current View indicator 1427 reflect a user's current position in the table history. Edit History option 1428 brings up a new window where the entire history is displayed visually allowing edits, insertions, or removal of data transformations. Edit Prev Op option 1429 lets a user edit the previous transformation.

Data destination panel 1430 permits a user to construct a configuration file 1315 by selecting Evidence Inducer from a Classifier menu within a Mining Tools panel. Discrete Labels menu provides a list of possible discrete labels (e.g., edible and poisonous for a mushroom data set). Discrete attributes (binned values, character string values, or a few integers) have a limited number of values. A user can select desired discrete label values. These selected label values are the ones an evidence classifier 1220, 1320 can predict. If there are no discrete attributes, the menu shows No Discrete label. A user must create a discrete attribute by binning or adding a new column using data transformation panel 1420.

Alternatively, a Decision-Tree inducer can be configured, as described in the co-pending related application "Method, System, and Computer Program Product for Visualizing a Decision-Tree Classifier," by R Kohavi et al. (appl. Ser. No. 08/813,336) filed Mar. 7, 1997, incorporated above by reference. In this way, an integrated data mining system for visualizing an evidence classifier and a decision-tree classifier is realized.

Figure 15A:
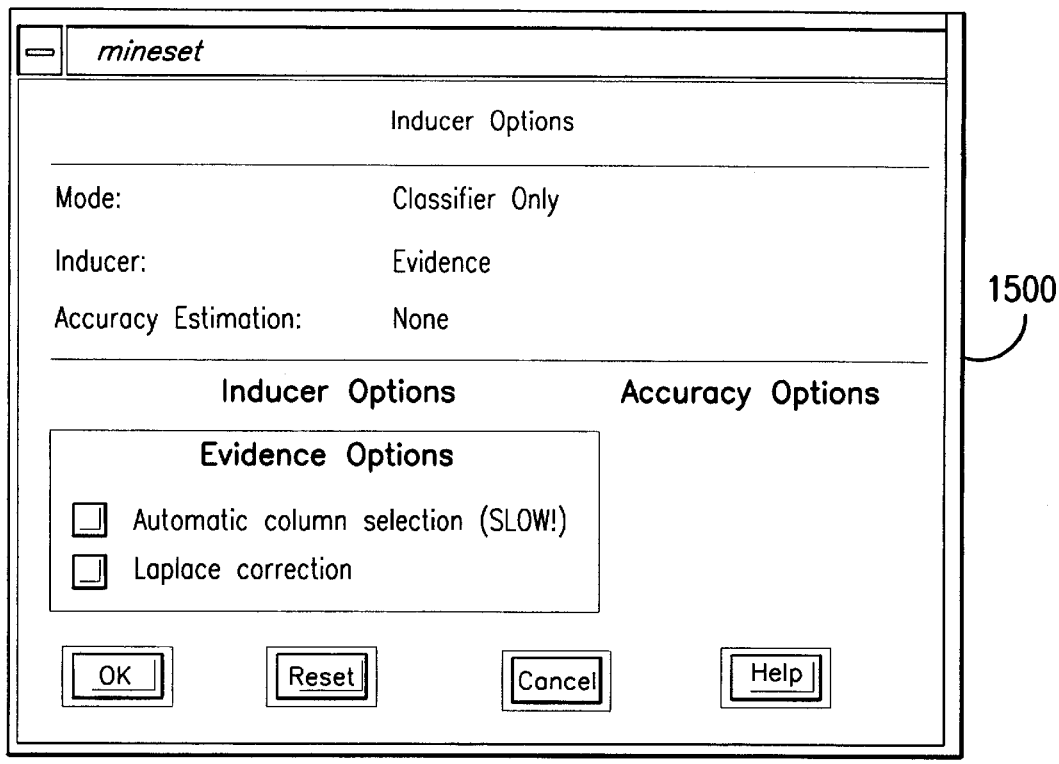
FIGS. 15A, 15B, and 15C show panels for defining further evidence inducer options according to the present invention.
Figure 15B:
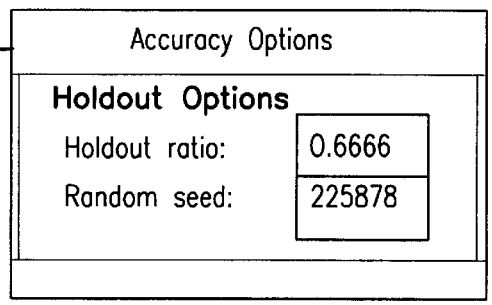
Figure 15C:
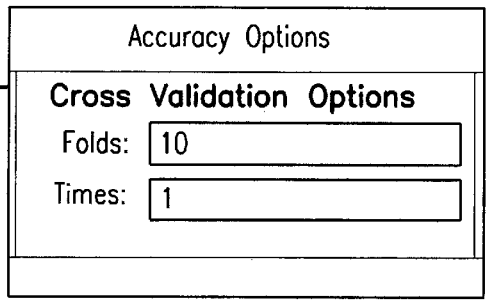

The present invention allows a user to fine-tune evidence inducer 1210, 1310 depending upon a desired classifier accuracy and other design goals (see, FIGS. 15A to 15C). When a classifier is built, it is useful to know how well a user can expect to perform in the future (how accurate its classification will be). Factors affecting classification accuracy include the following:

The number of records available in the training set.
   Since the inducer must learn from the training set, the larger the training set, the more reliable the classifier should be; however, the larger the training set, the longer it takes the inducer to build a classifier. The value of the improvement to the accuracy may decrease as the size of the training set increases (this is a case of diminishing returns).
The number of attributes.
   More attributes mean more combinations for the evidence inducer to compute, making the problem more difficult for the inducer and requiring more time. If an attribute is irrelevant to the task, it can removed from the training set (this can be done using Tool Manager 1305). Removing unnecessary attributes can avoid random correlations which can lead an inducer astray to build a less accurate classifier (technically, this known as "overfitting").
The information in the attributes.
   Sometimes there is not enough information in the attributes to correctly predict the label with high accuracy (for example, trying to determine someone's salary based on their eye color). Adding other attributes (such as profession, hours per week, and age) might increase the accuracy).
The distribution of future unlabeled records.
   If future records come from a distribution different from that of the training set, the accuracy will probably be low. For example, if a user builds a classifier to predict something from a training set containing family cars, it may not be useful to classify records containing many sport cars because the distribution of attributes can be very different.

Two common methods for estimating the accuracy of a classifier are described below. Both of these assume that future records will be sampled from the same distribution as the training set.

Holdout: A portion of the records (commonly two-thirds) is used as the training set, while the rest is kept as a test set. The inducer is shown only two-thirds of the data and builds a classifier. The test set is then classified using the induced classifier, and the accuracy on this test set is the estimated accuracy. This method is fast, but since it uses only two-thirds of the data for building the classifier, it does not make efficient use of the data for learning. If all the data were used, it is possible that a more accurate classifier could be built.

Cross-validation: The data is split into k mutually exclusive subsets (folds) of approximately equal size. The inducer is trained and tested k times; each time, it is trained on all the data minus a different fold, then tested on that holdout fold. The estimated accuracy is then the average of the accuracies obtained. Cross-validation can be repeated multiple times (t). For a t times k-fold cross-validation, k*t classifiers are built and evaluated. This means the time for cross-validation is k*t times longer. by default, k=10 and t=1, so cross-validation takes approximately 10 times longer than building a single classifier. Increasing the number of repetitions (t) increases the running time and improves the accuracy estimate and the corresponding confidence interval.

A user can increase or decrease k. Reducing it to 3 or 5 shortens the running time; however, estimates are likely to be biased pessimistically because of the smaller training set sizes. A user can increase k, especially for very small data sets. Generally, a holdout estimate should be used at the exploratory stage, as well as on very large data sets. Cross-validation should be used for the final classifier building phase, as well as on small data sets.

See, the summary of accuracy estimation techniques given in Kohavi, R., "A Study of Cross-Validation and Bootstrap for Accuracy Estimation and Model Selection," *Proceedings of the 14th International Joint Conference on Artificial Intelligence*, edited by C. S. Mellish, Morgan Kaufmann Publishers, Inc. (1995) (incorporated in its entirety herein by reference).

FIG. 15A shows a panel 1500 for further inducer options that can be selected from panel 1400 to tailor the evidence inducer 1210, 1310. There are three modes for running evidence inducer 1210, 1310: Classifier and Accuracy, Classifier Only, and Estimate Accuracy. Panel 1500 displays which mode the evidence inducer 1310 is to be run (Classifier only, Classifier & Accuracy, Estimate Accuracy).

The Classifier and Accuracy mode uses a holdout method to build a classifier: a random portion of the data is used for training (commonly two-thirds) and the rest for testing. A holdout proportion can be set automatically or by the user. This method is the default mode and is recommended for initial explorations. It is fast and provides an accuracy estimate.

The Classifier Only mode uses all the data to build the classifier. There is no accuracy estimation. This mode. is helpful when there is little data or when a user builds the final evidence classifier.

The Estimate Accuracy mode does not build a classifier, but assesses the accuracy of a classifier that would be built if all the data were used (as with Classifier Only mode). Estimate Accuracy uses cross-validation, resulting in longer running times. Cross-validation splits the data into k folds (commonly 10) and builds k classifiers. The process can be repeated multiple times to increase the reliability of the estimate. A user can set the number k and the number of times. This method is a good choice when there is little data (less than 1,000 records), or when a classifier is built from the fill data set using the Classifier Only option and a user needs a final accuracy estimate.

In both Classifier & Accuracy and Estimate Accuracy modes, a user can see a random seed that determines how the data is split into training and testing sets. Changing the random seed causes a different split of the data into training and test sets. If the accuracy estimate varies appreciably, the induction process is not stable. In Classifier & Accuracy mode, a user can set the Holdout Ratio of records to keep as the training set. This defaults to 0.6666 (two-thirds). The rest of the records are used for assessing the accuracy. In Estimate Accuracy mode, a user can set the number of folds in cross-validation and the number of times to repeat the process.

Panel 1500 shows an example of when Classifier Only mode is used. Panel 1500 displays the evidence inducer mode (Classifier Only), inducer type (evidence), accuracy estimation (none), an Inducer Options box and an Accuracy Options box. For Classifier Only mode, the Accuracy option box is blank.

The Inducer Options box includes evidence options (Automatic Column selection and Laplace Correction). Automatic column section applies a process that chooses only those columns that help prediction the most. Because extra columns can degrade the prediction, accuracy of the evidence classifier, this process searches for a good subset of the columns automatically. Only those columns found to be useful are used. This process can take a long time, especially if there are many columns. The selection of columns is done by estimating the accuracy of different attribute sets using the wrapper approach. See, Kohavi, R., and Sommerfield, D., Feature Subset Selection Using the Wrapper Model: Overfitting and Dynamic Search Space Topology, The First International Conference on Knowledge Discovery and Data Mining, pp. 192–197 (1995) (incorporated in its entirety herein by reference).

Laplace Correction biases the probabilities towards the average, thus avoiding extreme numbers (such as zero and one). The fewer the records in a bin, the more it will be changed towards the average. See, Cestnik, B., *Estimating Probabilities: A Crucial Task in Machine Learning*, Proceedings of the Ninth European Conference on Artificial Intelligence, pp. 147–149 (1990) (incorporated in its entirety herein by reference).

FIG. 15B shows an Accuracy Option box 1510 that is displayed in panel 1500 in a Classifier & Accuracy mode. FIG. 15C shows an Accuracy Option box 1520 that is displayed in panel 1500 in an Estimate Accuracy mode.

Example GUI Computer Environment

Figure 16:
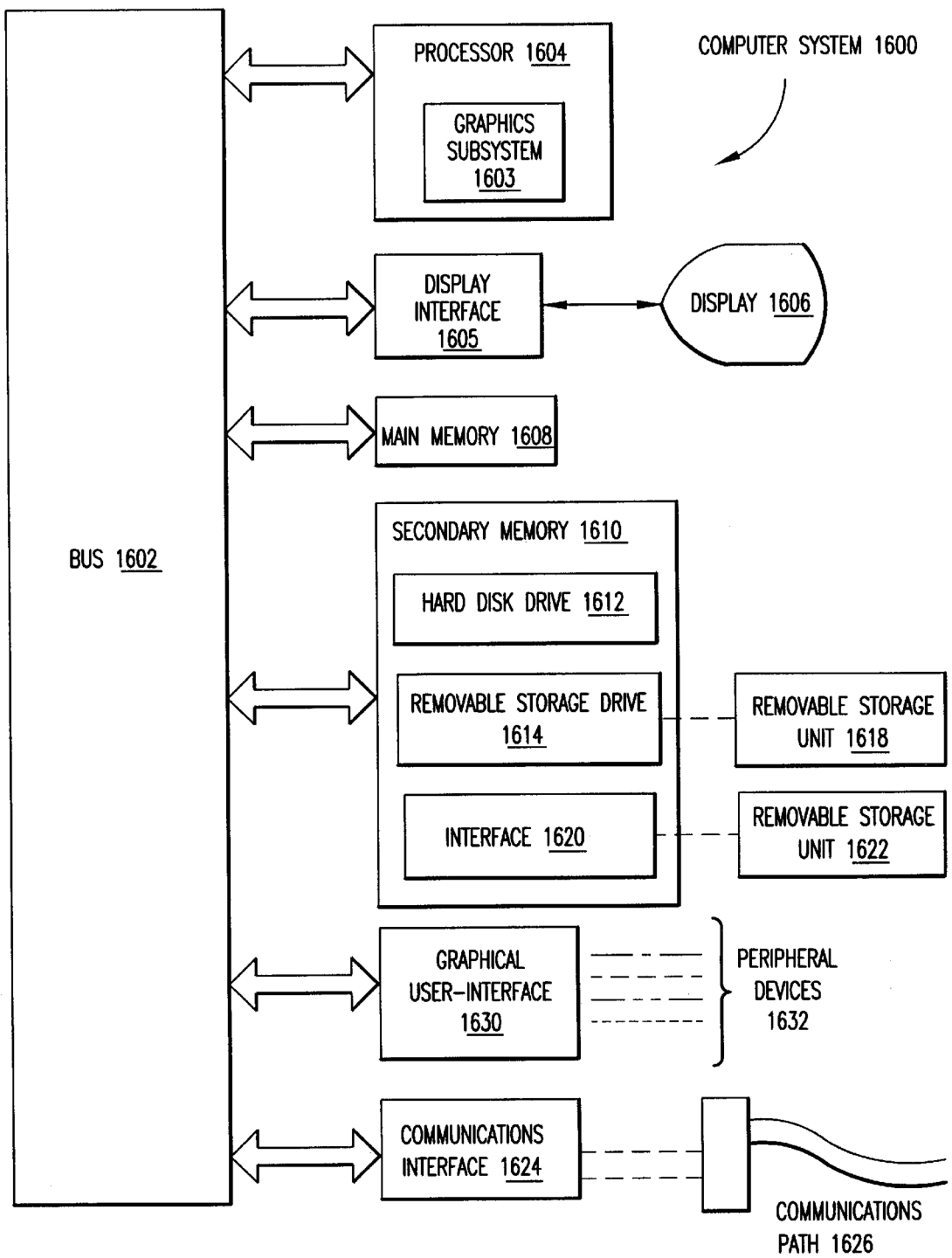
FIG. 16 shows an example graphical user-interface computer system for implementing an evidence classifier visualization tool according to the present invention.

FIG. 16 is a block diagram illustrating an example environment in which the present invention can operate. The environment is a computer system 1600 that includes one or more processors, such as processor 1604. The processor 1604 is connected to a communications bus 1602. Various software embodiments are described in terms of this example computer system. After reading this description, it will be apparent to a person skilled in the relevant art how to implement the invention using other computer systems and/or computer architectures.

Computer system 1600 includes a graphics subsystem 1603. Graphics subsystem 1603 can be implemented as one or more processor chips. The graphics subsystem 1603 can be included as part of processor 1604 as shown in FIG. 16 or as a separate graphics engine or processor. Graphics data is output from the graphics subsystem 1603 to the bus 1602. Display interface 1605 forwards graphics data from the bus 1602 for display on the display unit 1606. This graphics data includes graphics data for the screen displays described herein.

Computer system 1600 also includes a main memory 1608, preferably random access memory (RAM), and can also include a secondary memory 1610. The secondary memory 1610 can include, for example, a hard disk drive 1612 and/or a removable storage drive 1614, representing a floppy disk drive, a magnetic tape drive, an optical disk drive, etc. The removable storage drive 1614 reads from and/or writes to a removable storage unit 1618 in a well known manner. Removable storage unit 1618 represents a floppy disk, magnetic tape, optical disk, etc., which is read by and written to by removable storage drive 1614. As will be appreciated, the removable storage unit 1618 includes a computer usable storage medium having stored therein computer software and/or data.

In alternative embodiments, secondary memory 1610 may include other similar means for allowing computer programs or other instructions to be loaded into computer system 1600. Such means can include, for example, a removable storage unit 1622 and an interface 1620. Examples can include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to computer system 1600.

Computer system 1600 can also include a communications interface 1624. Communications interface 1624 allows software and data to be transferred between computer system 1600 and external devices via communications path 1626. Examples of communications interface 1624 can include a modem, a network interface (such as an Ethernet card), a communications port, etc. Software and data transferred via communications interface 1624 are in the form of signals which can be electronic, electromagnetic, optical or other signals capable of being received by communications interface 1624, via communications path 1626. Note that communications interface 1624 provides a means by which computer system 1600 can interface to a network such as the Internet.

Graphical user interface module 1630 transfers user inputs from peripheral devices 1632 to bus 1606. These peripheral devices 1632 can be a mouse, keyboard, touch screen, microphone, joystick, stylus, light pen, or any other type of peripheral unit. These peripheral devices 1632 enable a user to operate and control the evidence classifier visualization tool of the present invention as described herein.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 13. In this document, the. term "computer program product" is used to generally refer to removable storage device 1618 or a hard disk installed in hard disk drive 1612. These computer program products are means for providing software to computer system 1600.

Computer programs (also called computer control logic) are stored in main memory and/or secondary memory 1610. Computer programs can also be received via communications interface 1624. Such computer programs, when executed, enable the computer system 1600 to perform the features of the present invention as discussed herein. In particular, the computer programs, when executed, enable the processor 1604 to perform the features of the present invention. Accordingly, such computer programs represent controllers of the computer system 1600.

In an embodiment where the invention is implemented using software, the software may be stored in a computer program product and loaded into computer system 1600 using removable storage drive 1614, hard drive 1612, interface 1620, or communications interface 1624. Alternatively, the computer program product may be downloaded to computer system 1600 over communications path 1626. The control logic (software), when executed by the processor 1604, causes the processor 1604 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An integrated data mining system comprising:
   an evidence inducer;
   means for configuring said evidence inducer to generate a first data file representing structure of an evidence classifier and a second data file representing structure of a decision-tree classifier;
   means for visualizing said evidence classifier structure based on said first data file; and
   means for visualizing said decision-tree classifier structure based on said second data file.

* * * * *